(12) United States Patent
Jolly et al.

(10) Patent No.: US 11,779,878 B2
(45) Date of Patent: Oct. 10, 2023

(54) CARBON DIOXIDE CAPTURE DEVICE AND METHOD

(71) Applicant: Enviro Ambient Corporation, Newton, MA (US)

(72) Inventors: Sanjeev Jolly, Louisville, KY (US); Paul Scott, Toronto (CA)

(73) Assignee: Enviro Ambient Corporation, Newton, MA (US)

( * ) Notice: Subject to any disclaimer, the term of this patent is extended or adjusted under 35 U.S.C. 154(b) by 197 days.

(21) Appl. No.: 16/466,019

(22) PCT Filed: Dec. 1, 2017

(86) PCT No.: PCT/IB2017/001590
§ 371 (c)(1),
(2) Date: Jun. 1, 2019

(87) PCT Pub. No.: WO2018/100430
PCT Pub. Date: Jun. 7, 2018

(65) Prior Publication Data
US 2020/0147542 A1  May 14, 2020

Related U.S. Application Data

(60) Provisional application No. 62/541,484, filed on Aug. 4, 2017, provisional application No. 62/428,907, filed on Dec. 1, 2016.

(51) Int. Cl.
*B01D 53/14* (2006.01)
*B01D 53/18* (2006.01)
*B01D 53/62* (2006.01)

(52) U.S. Cl.
CPC ......... *B01D 53/1475* (2013.01); *B01D 53/18* (2013.01); *B01D 53/62* (2013.01);
(Continued)

(58) Field of Classification Search
CPC ........ B01D 2252/103; B01D 2252/204; B01D 2256/22; B01D 2257/2045;
(Continued)

(56) References Cited

U.S. PATENT DOCUMENTS 6,720,359 B2    4/2004  O'Rear et al.
2012/0174784 A1    7/2012  Asen et al.
(Continued)

FOREIGN PATENT DOCUMENTS

CN    101983098 A    3/2011
CN    102218261 A    10/2011
(Continued)

OTHER PUBLICATIONS

Fog scrubber carbon dioxide—Google Search Year: 2021.*
(Continued)

*Primary Examiner* — Christopher P Jones
*Assistant Examiner* — Phillip Y Shao
(74) *Attorney, Agent, or Firm* — Lucas P. Watkins; Stephen J. Kenny; Foley Hoag LLP

(57) ABSTRACT

Disclosed are methods and systems for capturing carbon dioxide from a gas stream. The methods and systems can also be used to reduce pollutants from a gas stream. The nozzle alignment of the system avoids droplet collision and merger with a corresponding loss of surface area. The high surface area of the droplets allows for increased efficiency of $CO_2$ capture.

17 Claims, 27 Drawing Sheets

(52) U.S. Cl.
CPC .. *B01D 2252/204* (2013.01); *B01D 2257/504* (2013.01); *B01D 2257/80* (2013.01); *B01D 2258/0283* (2013.01)

(58) Field of Classification Search
CPC ...... B01D 2257/2047; B01D 2257/302; B01D 2257/404; B01D 2257/504; B01D 2257/60; B01D 2257/80; B01D 2258/0283; B01D 53/1475; B01D 53/18; B01D 53/62; C01B 32/50; Y02C 10/04; Y02C 20/40; Y02P 20/151
See application file for complete search history.

(56) References Cited

U.S. PATENT DOCUMENTS

| | | |
|---|---|---|
| 2013/0291725 A1 | 11/2013 | Lesniak et al. |
| 2020/0147542 A1 | 5/2020 | Jolly et al. |

FOREIGN PATENT DOCUMENTS

| | | | |
|---|---|---|---|
| CN | 103987440 A | 8/2014 | |
| EP | 0180670 A1 | 5/1986 | |
| JP | 2015/134340 A | 7/2015 | |
| KR | 101480686 B1 | 1/2015 | |
| WO | WO-2010/148513 A1 | 12/2010 | |
| WO | WO-2015/024014 A1 | 2/2015 | |
| WO | WO-2015024014 A1 * | 2/2015 | ............. B01D 53/22 |
| WO | WO-2015/051400 A1 | 4/2015 | |
| WO | WO-2015/054014 A1 | 4/2015 | |
| WO | WO-2018/100430 A1 | 6/2018 | |

OTHER PUBLICATIONS

Cadogan et al., "Diffusion Coefficients of CO2 and N2 in Water at Temperatures between 298.15 K and 423.15 K at Pressures up to 45 Mpa," Journal of Chemical & Engineering Data, 59: 519-525 (2014).

Carbon Dioxide and Carbonic Acid <http://ion.chem.usu.edu/~sbialkow/Classes/3650/Carbonate/Carbonic> 2006.

Chen et al., "Influence of droplet mutual interaction on carbon dioxide capture process in sprays," Applied Energy, 92: 185-193 (2012).

Chen et al., "A theoretical analysis of the capture of greenhouse gases by single water droplet at atmospheric and elevated pressures," Applied Energy, 88: 5120-5130 (2011).

Chen et al., "Numerical prediction of CO2 capture process by a single droplet in alkaline spray," Applied Energy, 109: 125-134 (2013).

Dixon et al., "The Absorption of Carbon Dioxide by Liquid Drops," JSCL, 69: 284-288 (1950).

Han et al., "Liquid Phase Mass Transfer Coefficient of Carbon Dioxide Absorption by Water Droplet," Energy Procedia, 37: 1728-1735 (2013).

Knoche, "Chemical reactions of CO2 in water," Biophysics and Physiology of Carbon Dioxide, 3-11 (1979).

Marx et al., "The Role of Water in Adsorption-based CO2 Capture Systems," Energy Procedia, 37: 107-114 (2013).

Shirazian et al., "Separation of CO2 by single and mixed aqueous amine solvents in membrane contactors: fluid flow and mass transfer modeling," Engineering with Computers, 28: 189-198 (2012).

Srinivsan et al., "Mass transfers to droplets formed by the controlled breakup of a cylindrical jet—physical absorption," Chemical engineering science, 43(12): 3141-3150 (1988).

Sundar et al., "Modeling the dynamics of carbon dioxide removal in the atmosphere," Computational Ecology and Software, 4(4): 248-268 (2014).

Whitman et al., "Absorption of Gases by a Liquid Drop," Industrial & engineering chemistry, 18(4): 363-367 (1926).

Extended European Search Report for EP Application No. EP 17875751 dated May 28, 2020.

International Preliminary Report on Patentability for International Application No. PCT/IB2017/001590 dated Jun. 4, 2019.

International Search Report and Written Opinion for International Application No. PCT/IB2017/001590, dated Apr. 11, 2018.

Amokrane et al., "Gas Absorption into a Moving Spheroidal Water Drop," J Atmos Sci, 56: 1808-1829 (1999).

* cited by examiner

CARBON DIOXIDE CAPTURE DEVICE AND METHOD

REFERENCE TO RELATED APPLICATIONS

This application is the U.S. National Stage of International Application No. PCT/IB2017/001590, filed Dec. 1, 2017, which claims the benefit of U.S. Provisional Patent Application No. 62/428,907, filed Dec. 1, 2016, and U.S. Provisional Patent Application No. 62/541,484, filed Aug. 4, 2016, the contents of each of which are fully incorporated by reference herein in their entirety.

BACKGROUND

Carbon dioxide ($CO_2$) is a significant greenhouse gas, and increased concentrations in the atmosphere and in the oceans are leading to global warming and ocean acidification, respectively. $CO_2$ is generated by various sources including power plants, industrial processes, and automobile emissions. $CO_2$ capture and sequestration technologies can greatly reduce $CO_2$ emissions from certain sources. Captured $CO_2$ has many uses, including as a precursor in the chemical industry (e.g., for urea, methanol, and metal carbonates), in carbonated beverages, and as a compressed gas in portable pressure tools (e.g., welding and airguns). Current methods of $CO_2$ capture and sequestration have certain limitations and drawbacks. For example, amine based technologies have high auxillary load and are expensive. WO 2015/024014 discloses $CO_2$ capture methods and systems. The described methods and systems include contacting the exhaust gas with an amine solution. In addition, the methods and systems use high speed (e.g., Mach 1) water droplets to absorb $CO_2$ in a high energy collision to efficiently capture $CO_2$ (WO 2015/024014, paragraphs [00121], [00159], and [00161]). The high pressures and compressed air needed for water droplet speeds near Mach 1 correlates with high energy consumption and specialized machinery. Alternate methods of $CO_2$ capture are needed.

SUMMARY

The disclosure provides methods and systems for capturing carbon dioxide from a gas stream. In some embodiments, the methods and systems also reduce pollutants from a gas stream.

In one aspect, provided herein is a method of treating a gas comprising:
  providing a stream of gas comprising carbon dioxide, wherein the gas is flowing in a first direction;
  dispensing a fluid comprising water, wherein the fluid is essentially free of amines, and wherein dispensing the fluid comprises spraying droplets of the fluid at a speed of less than Mach 1, and further wherein at least 90% of the droplets have a droplet size of less than about 50 microns.

In another aspect, provided herein is a method of producing carbon dioxide, comprising:
  treating a gas according to the methods described herein; and
  collecting carbon dioxide from the fluid.

In yet another aspect, provided herein is a system for capturing carbon dioxide from a flue gas, the system comprising:
  a gas conduit oriented along a first direction;
  a plurality of nozzles disposed along a plurality of headers and oriented orthogonal to the flue gas stream, the nozzles adapted to dispense a fluid consisting essentially of water and configured to provide droplets, wherein 90% of the droplets have a size of less than approximately 50 microns.

DETAILED DESCRIPTION

Figure 1A:
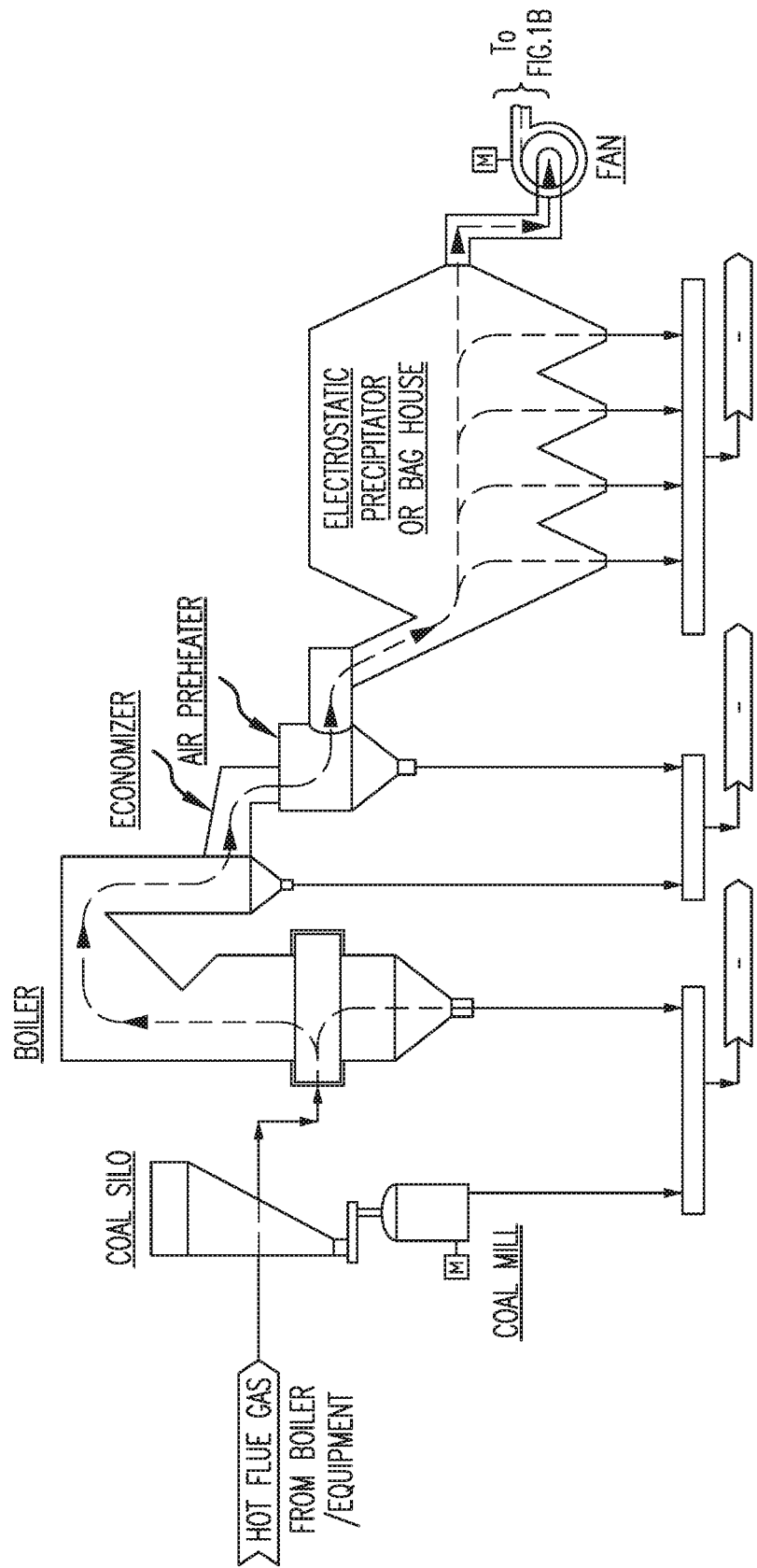
FIGS. 1A-D shows an exemplary arrangement for a system of the disclosure capable of capturing pollutants.
Figure 1B:
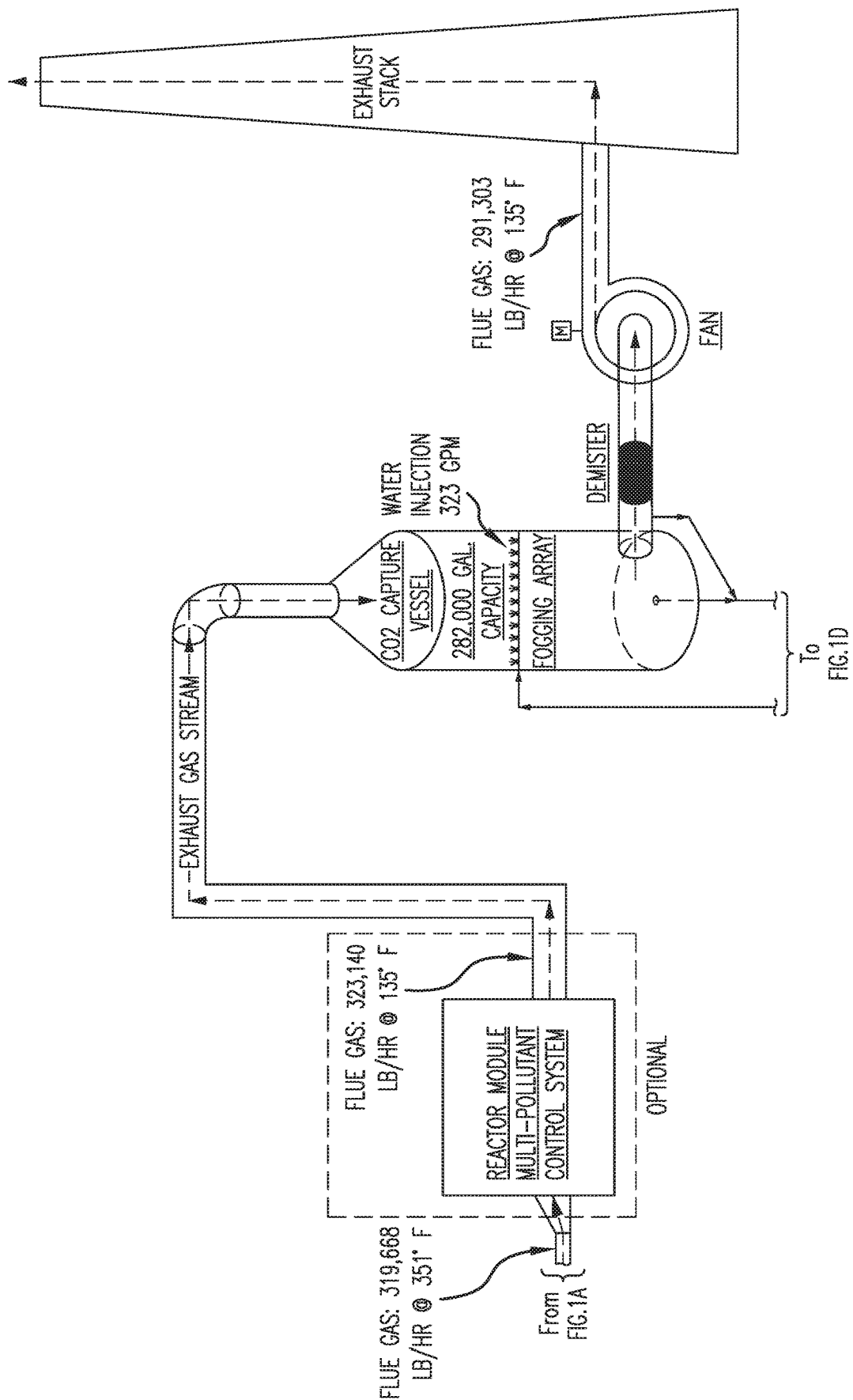
Figure 1C:
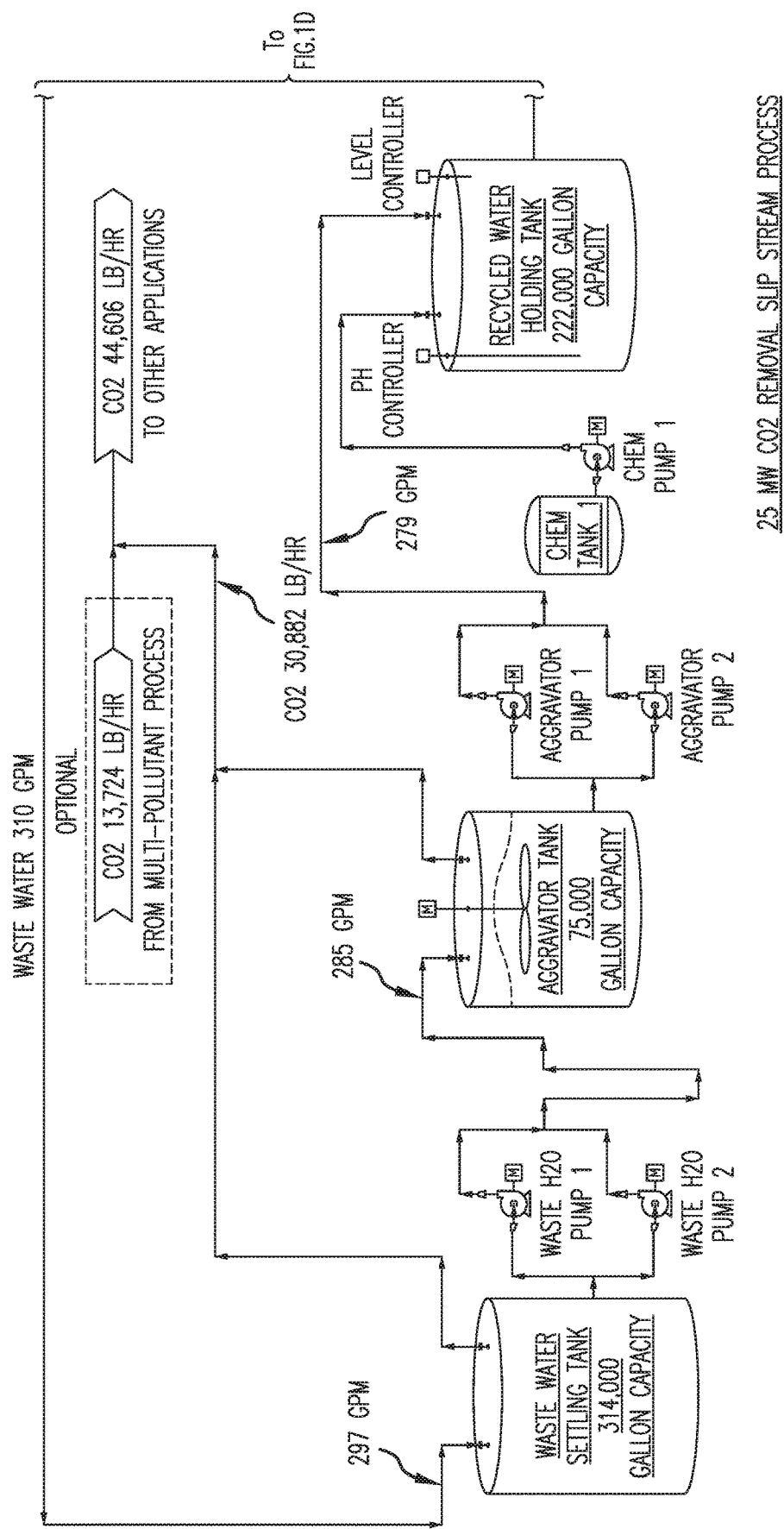
Figure 1D:
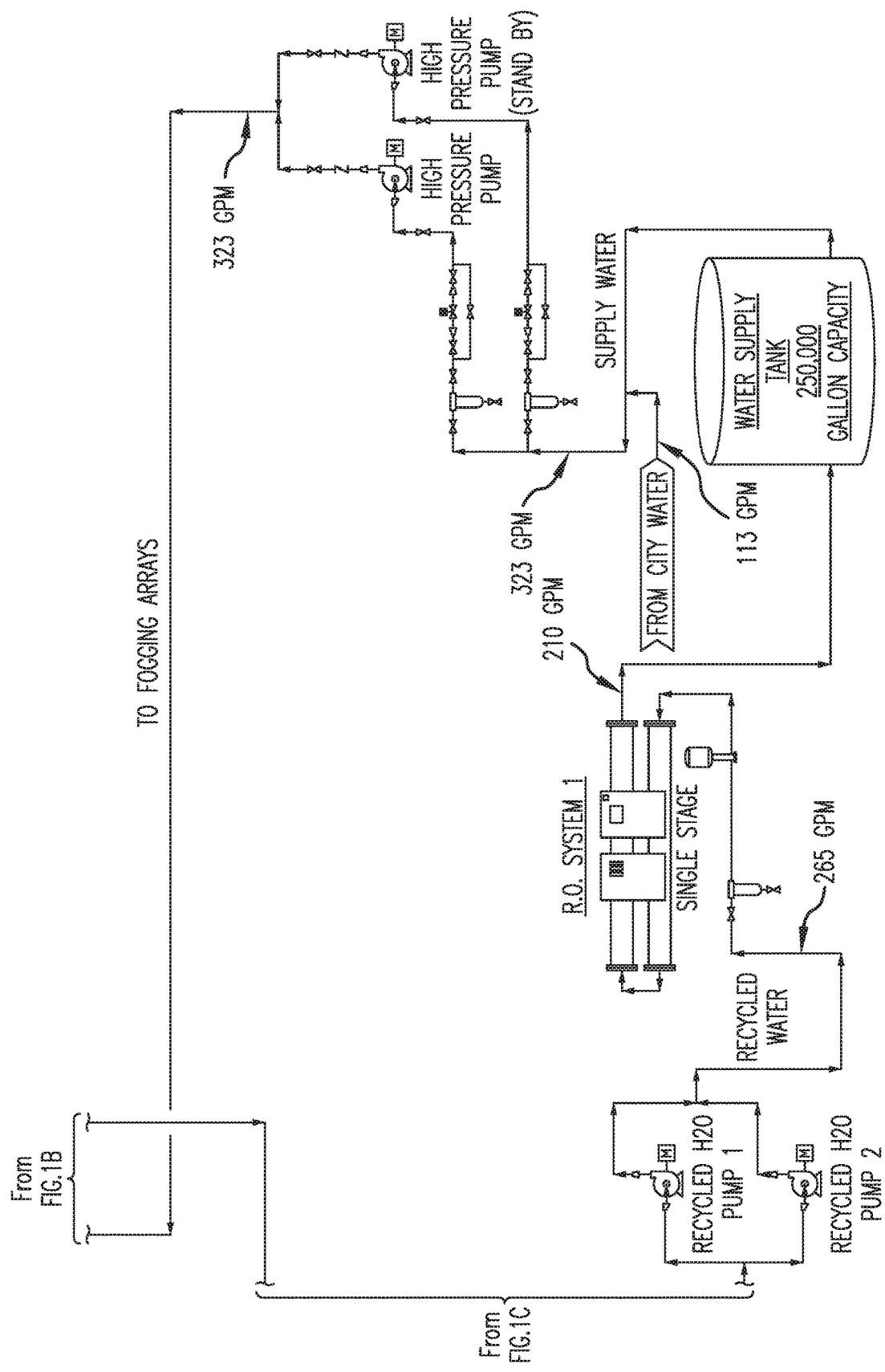
Figure 2A:
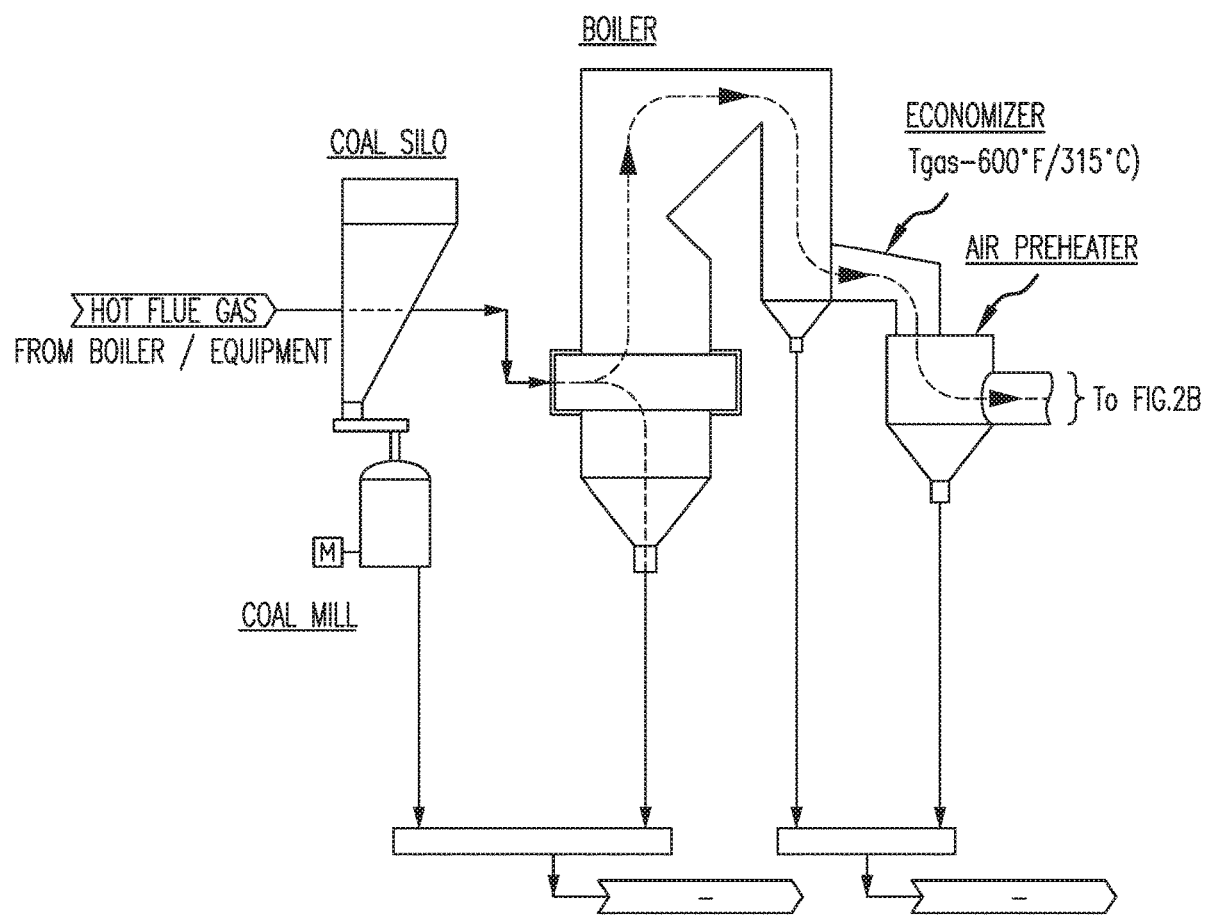
FIGS. 2A-J show another exemplary arrangement of the disclosure capable of capturing pollutants.
Figure 2B:
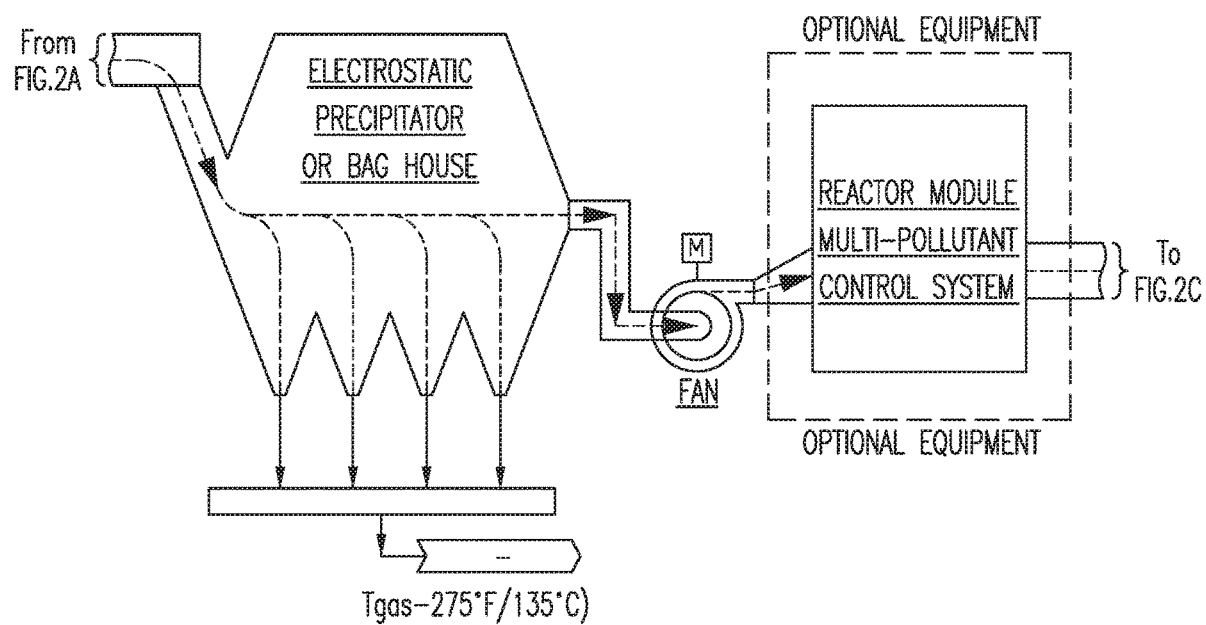
Figure 2C:
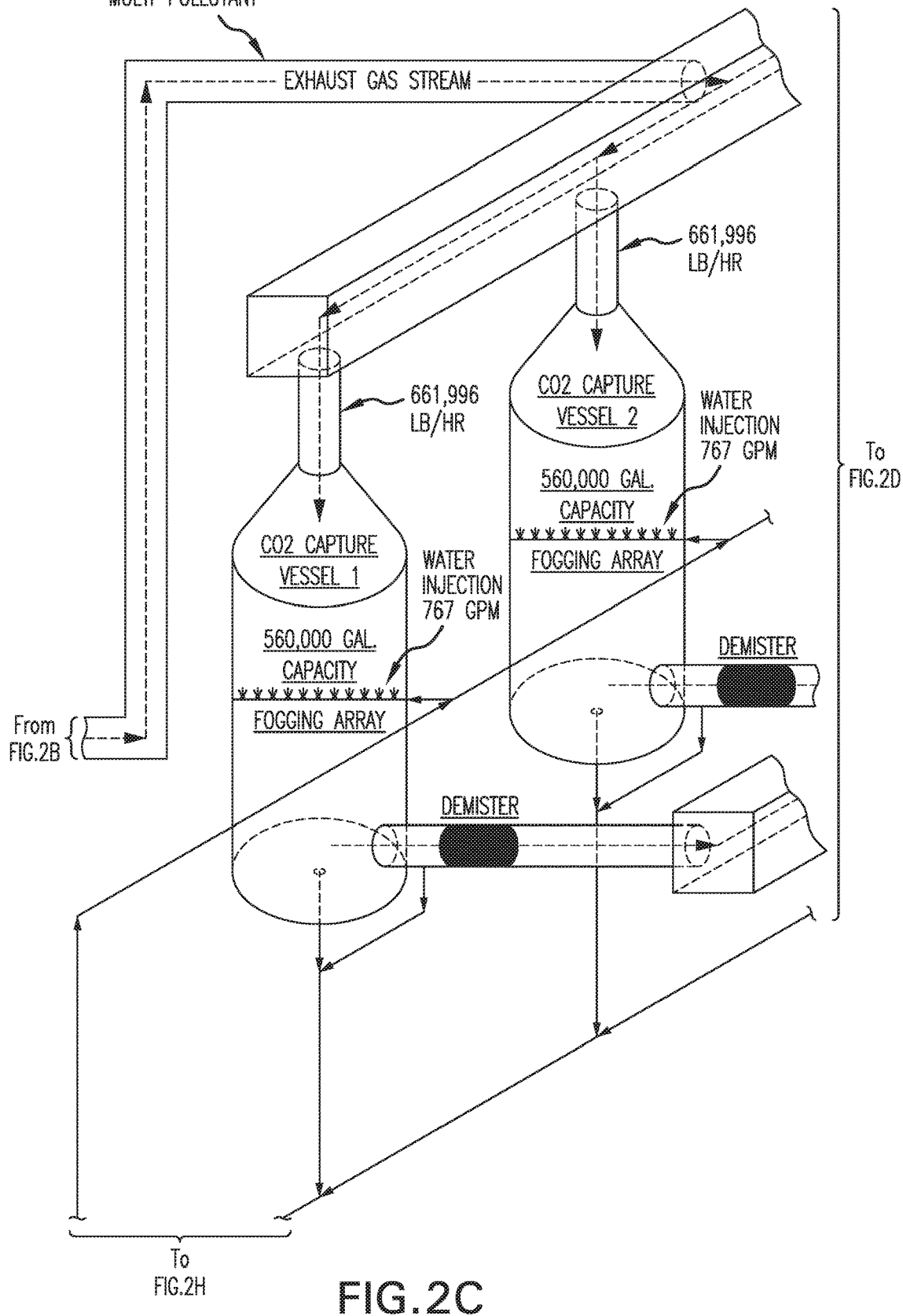
Figure 2D:
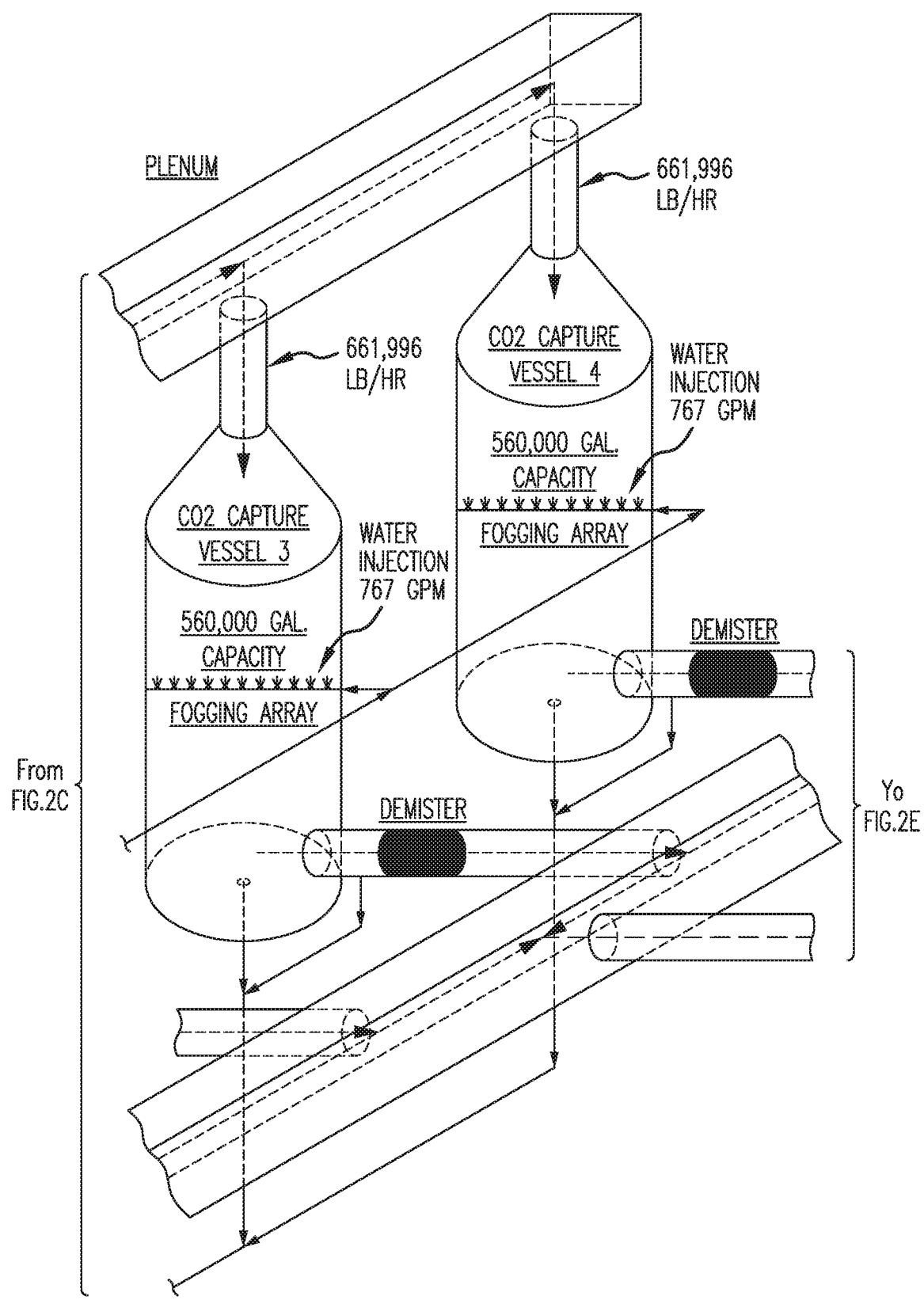
Figure 2E:
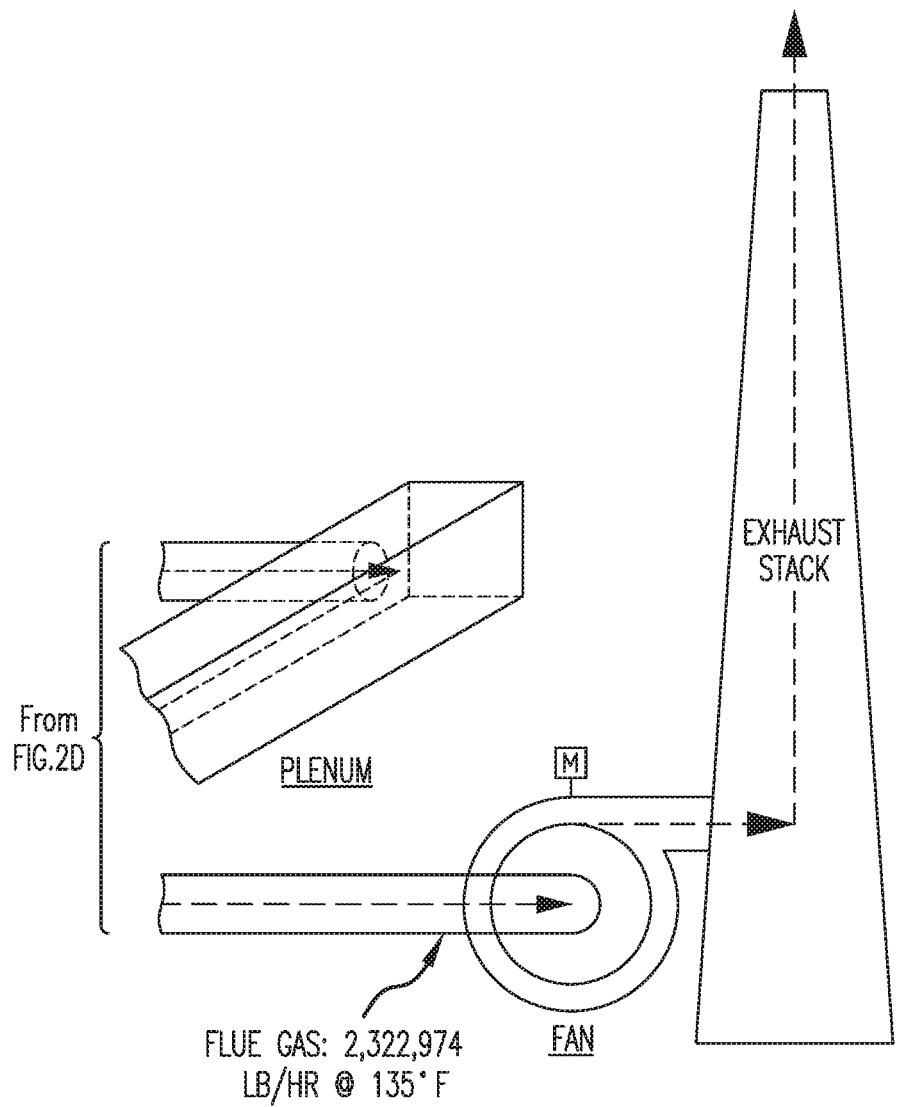
Figure 2F:
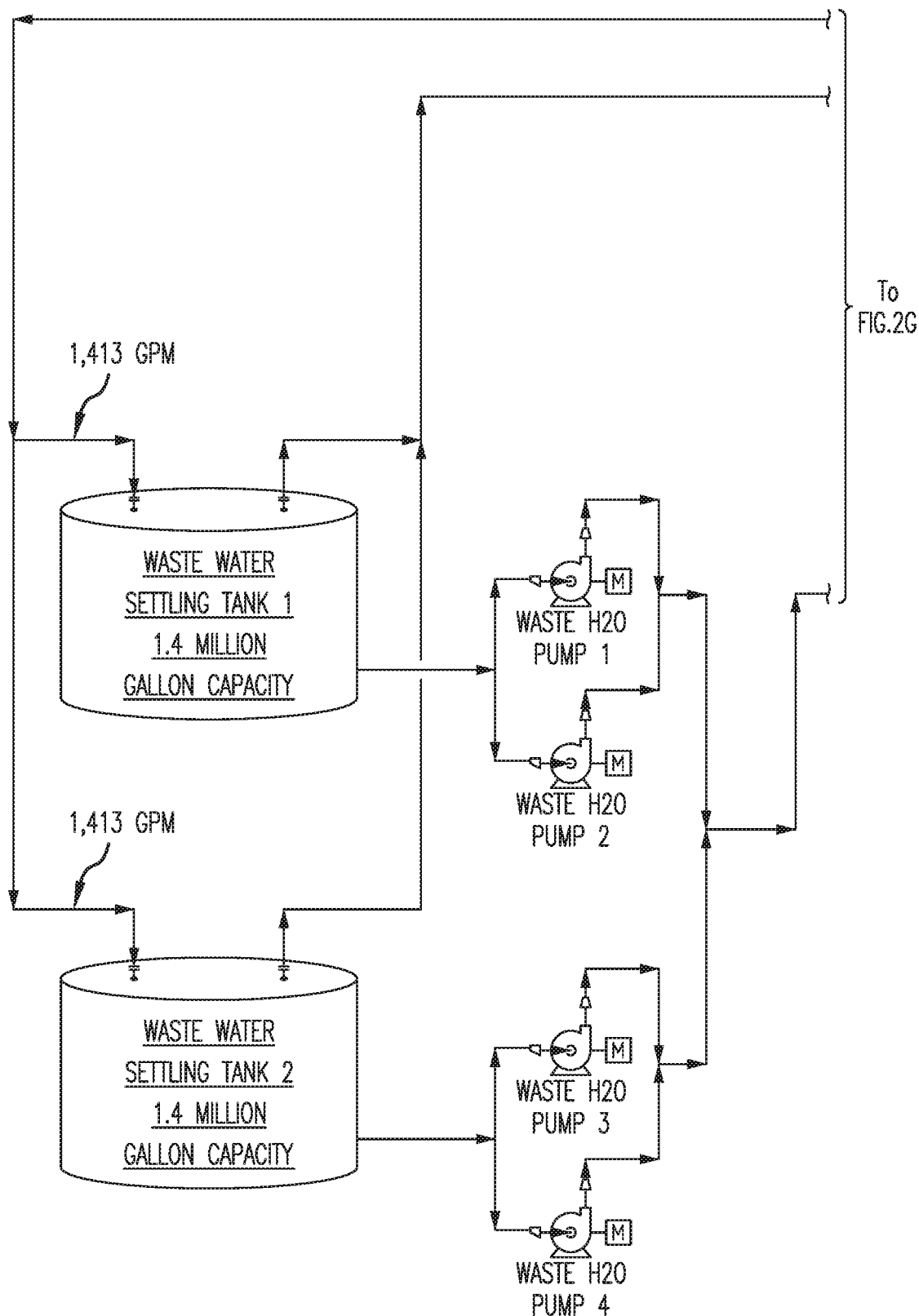
Figure 2G:
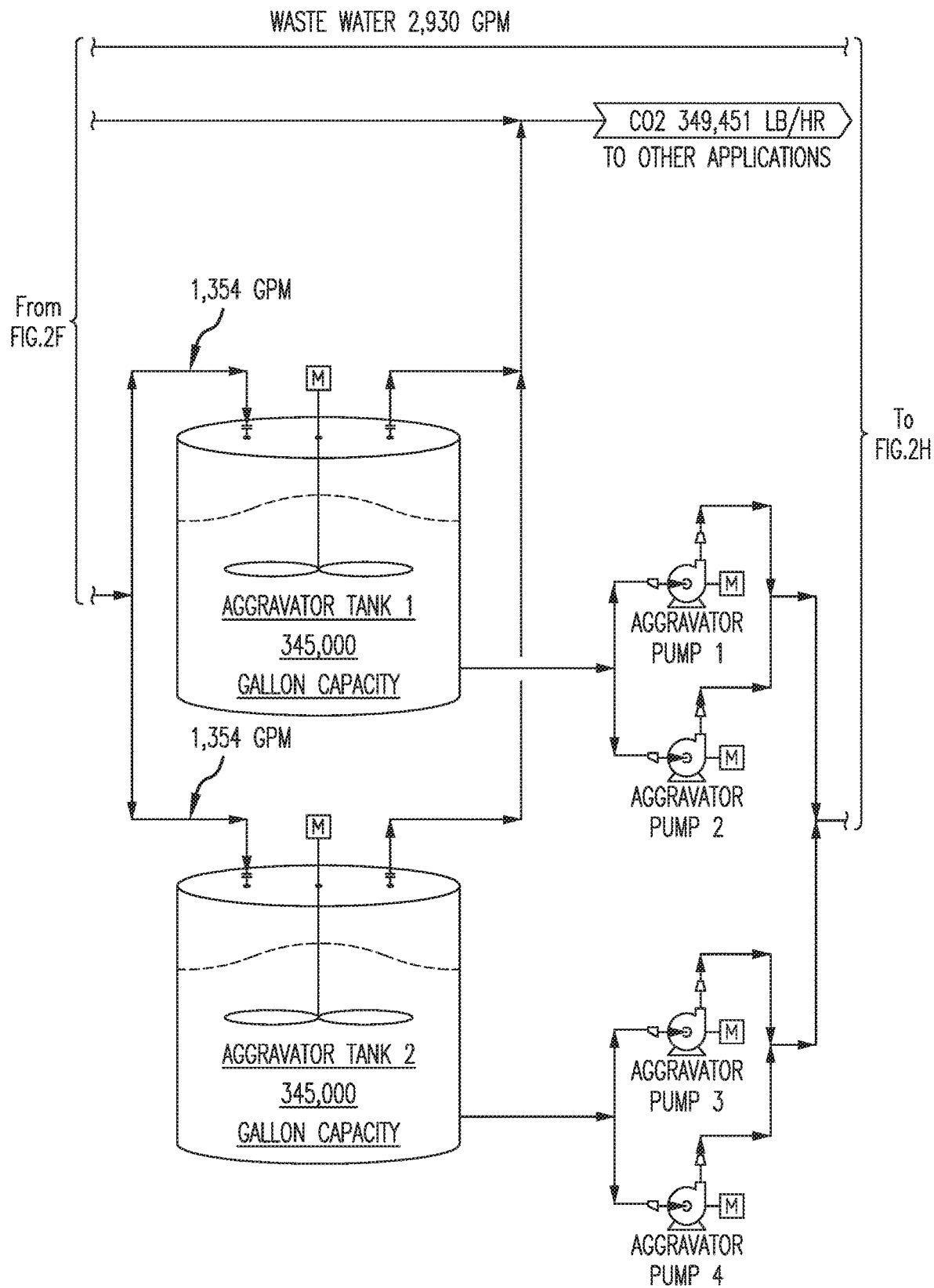
Figure 2H:
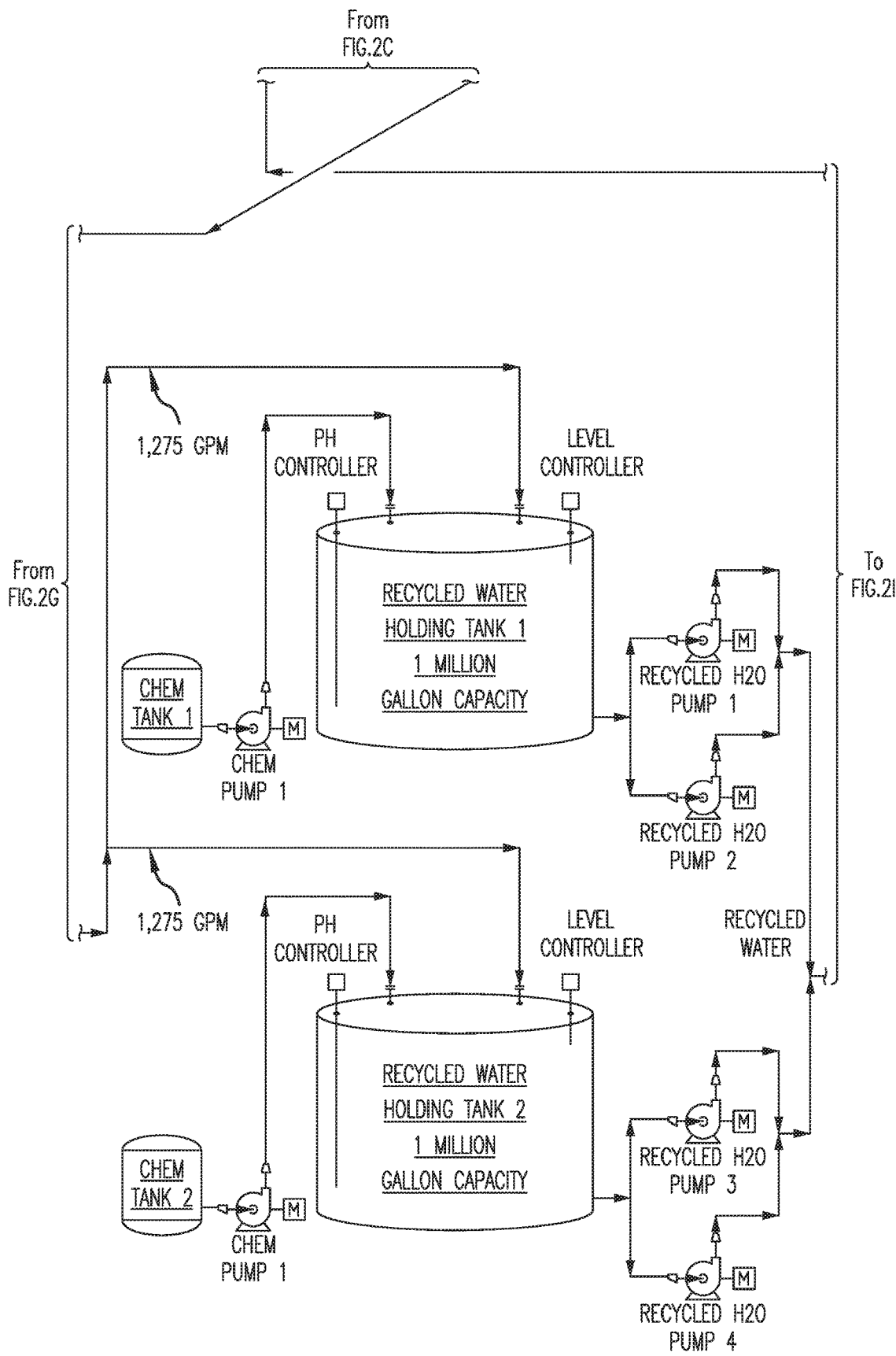
Figure 2I:
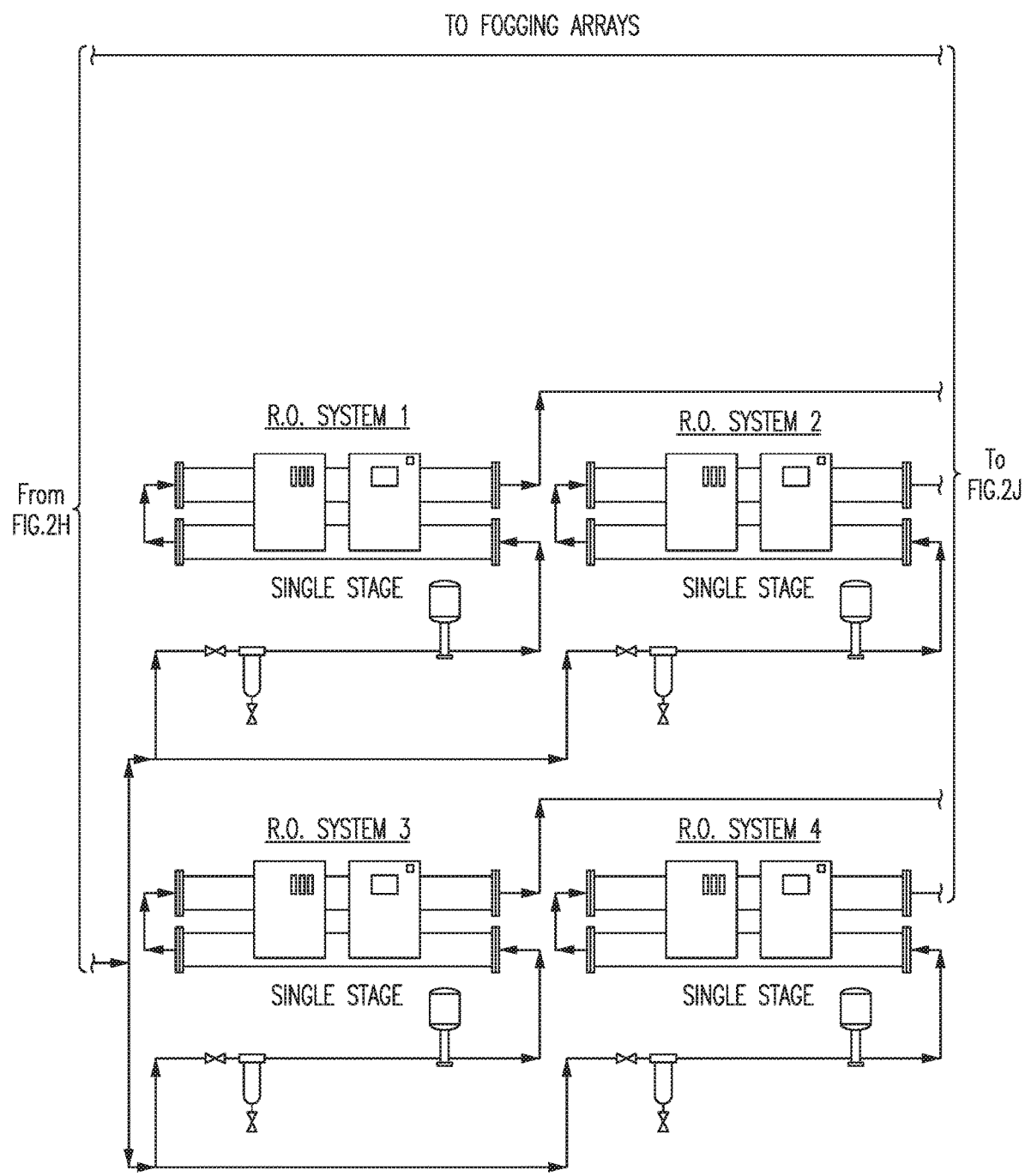
Figure 2J:
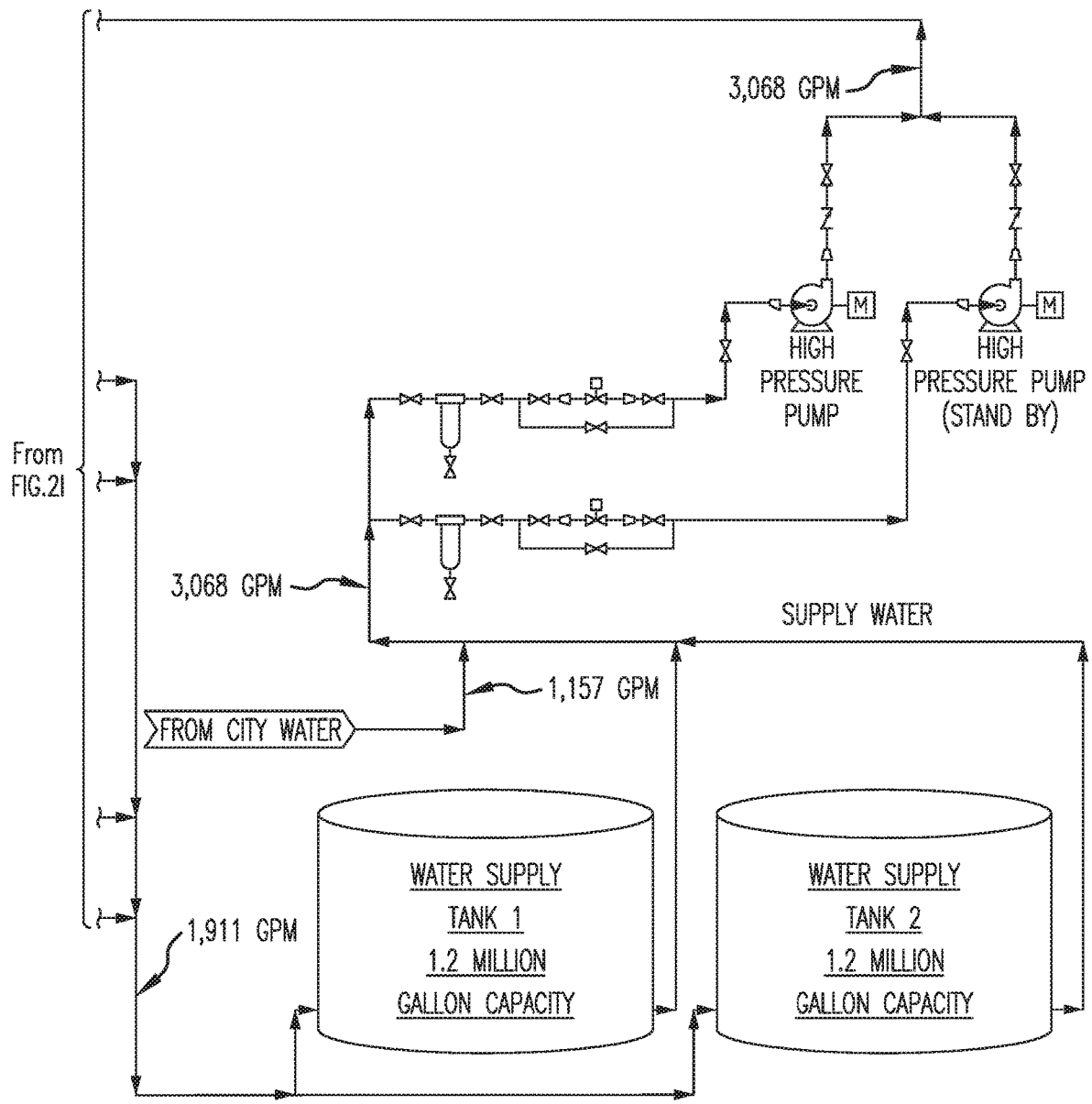

Disclosed herein are methods and systems for reducing pollutants from a gas stream. In some embodiments, the methods and systems capture carbon dioxide from a gas stream. The $CO_2$ removal process described herein is very efficient when compared to amine based technologies that have high auxiliary load, a larger footprint, and are more expensive. The $CO_2$ removal process described herein captures large volumes of $CO_2$ gases in the wastewater stream. In addition, other $CO_2$ capture processes have high liquid to gas ratios. The liquid to gas ratio for the methods and systems described herein is less than 10 gpm of water sprayed per 1000 ACFM of flue gas. Methods and systems using these fine droplets process energy efficiently. The nozzle alignment of the system avoids droplet collision and agglomeration with a corresponding loss of surface area. The high surface area of the droplets allows for increased efficiency of $CO_2$ capture. The water droplet speeds are below Mach 1, which reduces energy consumption and avoids specialized machinery.

Definitions

For convenience, certain terms employed in the specification, examples, and appended claims are collected here.

The articles "a" and "an" are used herein to refer to one or to more than one (i.e., to at least one) of the grammatical object of the article. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

For purposes of this disclosure, the chemical elements are identified in accordance with the Periodic Table of the Elements, CAS version, Handbook of Chemistry and Physics, 67th Ed., 1986-87, inside cover.

The term "NOx" as used herein refers to nitrogen oxide pollutants, including nitric oxide (NO), nitrogen dioxide ($NO_2$), nitrous oxide ($N_2O$), and other higher oxides of nitrogen such as dinitrogen pentoxide ($N_2O_5$). Nitrogen oxides are released into the air from automobile exhaust; the burning of coal, oil, diesel fuel, and natural gas (e.g., from electric power plants); or industrial processes (e.g., welding, electroplating, engraving, and dynamite blasting).

The term "SOx" as used herein refers to sulfur oxide pollutants, including sulfur dioxide ($SO_2$), sulfur trioxide ($SO_3$), sulfuric acid mist ($H_2SO_4$), and sulfates. The majority of SOx pollutants is in the form of $SO_2$ from combustion of fuels containing sulfur (e.g., bituminous coal and residual fuel oil).

The term "amine" as used herein refers to —$NH_2$ and substituted derivatives thereof wherein one or both of the hydrogens are independently replaced with substituents selected from the group consisting of alkyl, haloalkyl, fluoroalkyl, alkenyl, alkynyl, carbocyclyl, heterocyclyl, aryl, aralkyl, heteroaryl, heteroaralkyl, alkylcarbonyl, haloalkylcarbonyl, fluoroalkylcarbonyl, alkenylcarbonyl, alkynylcarbonyl, carbocyclylcarbonyl, heterocyclylcarbonyl, arylcarbonyl, aralkyl carbonyl, heteroarylcarbonyl, heteroaralkylcarbonyl, sulfonyl, and sulfinyl groups defined above; or when both hydrogens together are replaced with an alkylene group (to form a ring which contains the nitrogen). Representative examples include, but are not limited to methylamino, acetylamino, and dimethylamino.

The term "nozzle" as used herein refers to a device that controls the direction or characteristics (e.g., velocity) of fluid flow (e.g., liquid or gas) as it exits or enters an enclosed chamber or pipe. A nozzle has at least one orifice for dispensing the fluid. A nozzle can be a cylindrical, round, or conical spout at the end of a pipe or a hose.

The term "header" as used herein refers to an assembly on which one or more nozzles is mounted. The number of nozzles on the header can vary depending on tank diameter, volumetric flow, flue gas temperature, the amount of $CO_2$ to be captured, and the number of other headers present. For example, each header can include at least 1, 14, 22, 28, 32, or 33 nozzles. In the headers disclosed herein, the nozzles can be spaced at certain distances from each other.

The term "array" as used herein refers to an assembly comprising a multitude of headers. The headers in an array can be spaced at various distances from one another.

The term "Mach" as used herein refers to the ratio of the speed of the droplets to the speed of sound in the surrounding medium. For example, Mach 1 indicates the speed of sound (340.29 m/s or 67,519.7 ft/min at standard sea level conditions and 59° F.). The speed represented by Mach 1 is not a constant since, for example, it depends on temperature.

The term "pound-force per square inch" (psi) as used herein refers to the pressure resulting from a force of one pound-force applied to an area of one square inch.

$$1\ psi = \frac{1\ lbf}{(1\ in)^2} \approx \frac{4.4482N}{(0.0254m)^2} \approx 6894.757\ N/m^2\ or\ 6894.757\ Pa$$

Methods of the Disclosure

In one aspect, provided herein is a method of treating a gas comprising:

providing a stream of gas comprising carbon dioxide, wherein the gas is flowing in a first direction;

dispensing a fluid comprising water, wherein the fluid is essentially free of amines, and wherein dispensing the fluid comprises spraying droplets of the fluid, and further wherein at least 90% of the droplets have a droplet size of less than about 50 microns.

In other embodiments of the methods described herein, the gas stream comprises carbon dioxide and at least one pollutant: HCl, HF, heavy metals (including mercury), NOx, SOx, or fine particulates.

Dispensing droplets at subsonic speeds is advantageous in that the pressure differential at the nozzle orifice is lower than the systems described in WO 2015/024014. Consequently, the forces exhibited on the nozzle are reduced, allowing for a greater variety of mounting techniques of the nozzle. Additionally, the droplet exiting the nozzle is not exposed to the rapid change in pressure, temperature and entropy as encountered by supersonic systems.

In certain embodiments of the methods described herein, spraying the droplets comprises spraying the droplets at a droplet speed of less than Mach 1. In another embodiment, the relative velocity of the droplet is less than Mach 1, less than Mach 0.9, less than Mach 0.8, less than Mach 0.7, less than Mach 0.6, less than Mach 0.5, less than Mach 0.4, less than Mach 0.3, less than Mach 0.2, or less than Mach 0.1. In yet another embodiment, the relative velocity of the droplet is less than Mach 0.5.

In certain embodiments, spraying the droplets comprises spraying the droplets at a droplet speed of less than 65,000 ft/min. In other embodiments, the droplet speed is less than 60,000 ft/min. In other embodiments, the droplet speed is less than 50,000 ft/min, 40,000 ft/min, 30,000 ft/min, 20,000 ft/min, 10,000 ft/min, or 5,000 ft/min.

In another embodiment of the methods described herein, the gas is provided at a temperature in the range of approximately 50° F. to approximately 350° F. In one embodiment, the gas is provided at a temperature of greater than 55° F. In another embodiment, the gas is provided at a temperature of greater than 60° F. In yet another embodiment, the gas is provided at a temperature of greater than 70° F. In still another embodiment, the gas is provided at a temperature of greater than 80° F. In certain embodiments, the gas is provided at a temperature of approximately 100° F., approximately 110° F., approximately 120° F., approximately 130° F., approximately 135° F., approximately 140° F., approximately 150° F., approximately 160° F., or approximately 170° F.

In yet another embodiment of the methods described herein, the gas is provided with a continuous flow.

In still another embodiment of the methods described herein, dispensing the fluid comprises creating a wetted volume. The wetted volume may extend until the next gas treatment stage, if any, or may extend a certain distance from the nozzles. The wetted volume may extend from the nozzles in the direction of the spray, as well as in the direction of gas flow. The wetted volume may extend from upstream of the nozzles to downstream of the nozzles, and the extent of the wetted volume may depend on the rate of gas flow, the rate of fluid flow, and the droplet velocity. The wetted volume may be tuned based on these parameters, as well as others apparent to those of skill in the art, to optimize total carbon capture or carbon capture efficiency, depending on the application.

In some embodiments, the wetted volume has a fluid droplet density of 15 gallons of fluid per 1000 cubic feet of gas, 12 gallons of fluid per 1000 cubic feet of gas, 11 gallons of fluid per 1000 cubic feet of gas, 10 gallons of fluid per 1000 cubic feet of gas, 9 gallons of fluid per 1000 cubic feet of gas, 8 gallons of fluid per 1000 cubic feet of gas, 7 gallons of fluid per 1000 cubic feet of gas, 6 gallons of fluid per 1000 cubic feet of gas, 5 gallons of fluid per 1000 cubic feet of gas, 4 gallons of fluid per 1000 cubic feet of gas, 3 gallons of fluid per 1000 cubic feet of gas, 2 gallons of fluid per 1000 cubic feet of gas, or 1 gallon of fluid per 1000 cubic feet of gas. In other embodiments, the wetted volume has a fluid droplet density of 10 gallons of fluid per 1000 cubic feet of gas.

In certain embodiments, the gas has a residence time in the wetted volume of approximately less than 10 seconds, approximately less than 8 seconds, approximately less than 6 seconds, approximately less than 5 seconds, approximately less than 4 seconds, approximately less than 3 seconds, approximately less than 2 seconds, approximately less than 1 second, or approximately less than 0.5 seconds. In another embodiment, the gas has a residence time in the wetted volume of approximately less than 2 seconds. As described above, the gas residence time, along with other parameters described herein, may be varied to optimize system performance.

In another embodiment of the method described herein, the wetted volume has a fluid density of 15 gallons of fluid per 1000 cubic feet of gas, 12 gallons of fluid per 1000 cubic feet of gas, 11 gallons of fluid per 1000 cubic feet of gas, 10 gallons of fluid per 1000 cubic feet of gas, 9 gallons of fluid per 1000 cubic feet of gas, 8 gallons of fluid per 1000 cubic feet of gas, 7 gallons of fluid per 1000 cubic feet of gas, 6 gallons of fluid per 1000 cubic feet of gas, 5 gallons of fluid per 1000 cubic feet of gas, 4 gallons of fluid per 1000 cubic feet of gas, 3 gallons of fluid per 1000 cubic feet of gas, 2 gallons of fluid per 1000 cubic feet of gas, or 1 gallon of fluid per 1000 cubic feet of gas. In other embodiments, the wetted volume has a fluid density of 10 gallons of fluid per 1000 cubic feet of gas. As described above, the fluid density in the wetted volume, along with other parameters described herein, may be varied to optimize system performance.

In some embodiments of the methods described herein, the liquid to gas ratio is less than 20 gallons per 1000 cubic foot, i.e. a liquid:gas ratio of 2.67:1000. In another embodiment, the liquid to gas ratio is less than 15 gallons per 1000 cubic foot, i.e. a liquid:gas ratio of 2.01:1000. In another embodiment, the liquid to gas ratio is less than 10 gallons per 1000 cubic foot, i.e. a liquid:gas ratio of 1.33:1000. In another embodiment, the liquid to gas ratio is less than 5 gallons per 1000 cubic foot, i.e. a liquid:gas ratio of 0.67:

1000. In another embodiment, the liquid to gas ratio is less than 2 gallons per 1000 cubic foot, i.e. a liquid:gas ratio of 0.267:1000. In other embodiments, the liquid to gas ratio is 1:1000, 9:10,000, 8:10,000, 7:10,000, 6:10,000, 5:10,000, 4:10,000, 3:10,000, 2:10,000, or 1:10,000.

One advantage of the methods described herein is that the fluid may be provided at ambient temperature, i.e., without being artificially heated or cooled from the temperature in the location of the holding tank. In some embodiments of the methods described herein, the fluid is provided at a temperature in the range of approximately 32° F. to approximately 212° F. In one embodiment, the fluid is provided at a temperature of greater than 50° F. In one embodiment, the fluid is provided at a temperature of greater than 55° F. In another embodiment, the fluid is provided at a temperature of greater than 60° F. In yet another embodiment, the fluid is provided at a temperature of greater than 70° F. In still another embodiment, the fluid is provided at a temperature of greater than 80° F.

In certain embodiments, of the methods described herein, the fluid is essentially free of amine. In others embodiment of the methods described herein, the fluid consists essentially of water.

In certain embodiments of the methods described herein, the method comprises spraying the droplets wherein the droplets are sprayed in a pattern approximately centered on a direction opposite to the first direction. In yet another embodiment, the droplets are sprayed in a pattern approximately centered on the first direction. In other embodiments, the droplets are sprayed in a pattern angled with respect to the first direction. Additionally or alternatively, droplets can be simultaneously sprayed in a plurality of directions to provide a gradient or zones of differing amounts of droplets distributed along the direction of the gas stream. The spray pattern may be a cone, a square cone, or any other spray pattern known in the art.

In certain embodiments of the methods described herein, spraying droplets of the fluid comprises providing the fluid to an array of nozzles. In another embodiment, providing the fluid to an array of nozzles comprises providing the fluid at a fluid pressure of at least 700 psi. In further embodiments, the pressure is between approximately 700 psi to approximately 2,000 psi. In some embodiments, the fluid pressure is between approximately 1,000 psi to approximately 2,000 psi. In another embodiment, the fluid pressure is between approximately 1,500 psi to approximately 2,000 psi.

In another embodiment of the methods described herein,
the nozzles are disposed within a plurality of headers;
the headers are disposed orthogonal to the flow direction of the gas; the plurality of headers extend across the flow direction of the gas;
the headers are spaced a distance of at least approximately 8 inches from each other, and
the nozzles are spaced a distance of at least approximately 12 inches from each other along their respective headers.

In other embodiments of the methods described herein, the array of nozzles includes between 1 and 20 headers inclusive. In another embodiment, the array of nozzles includes 5 headers, 6 headers, 7 headers, 8 headers, 9 headers, 10 headers, 11 headers, 12 headers, 13 headers, 14 headers, 15 headers, or 16 headers. In another embodiment, the array of nozzles includes 12 headers.

In another embodiment of the methods described herein, each header includes at least 10 nozzles, at least 14 nozzles, at least 18 nozzles, at least 22 nozzles, at least 26 nozzles, or at least 30 nozzles. In some embodiments, each header includes at least 14 nozzles. In yet another embodiment, each header includes 12 nozzles, 14 nozzles, 16 nozzles, 18 nozzles, 20 nozzles, 22 nozzles, 24 nozzles, 26 nozzles, 28 nozzles, 30 nozzles, 32 nozzles, 33 nozzles, 34 nozzles, or 35 nozzles. In still another embodiment, each header includes 14 nozzles, 22 nozzles, 28 nozzles, 32 nozzles, or 33 nozzles.

In certain embodiments, the header and nozzle configuration includes:

a first header having 14 nozzles;
a second header having 22 nozzles;
a third header having 28 nozzles;
a fourth header having 32 nozzles;
a fifth header having 33 nozzles;
a sixth header having 32 nozzles;
a seventh header having 33 nozzles;
an eighth header having 33 nozzles;
a ninth header having 32 nozzles;
a tenth header having 28 nozzles;
an eleventh header having 22 nozzles; and
a twelfth header having 14 nozzles.

In one embodiment, the header and nozzle configuration is as depicted in FIG. 3A.

In another aspect, provided herein is a method of producing carbon dioxide, comprising:

treating a gas according to the methods described herein; and collecting carbon dioxide from the fluid.

In another embodiment, the wastewater is captured in a tank. Without being bound by theory, it is believed that, due to surface-area effects, the micron-sized droplets used by the present methods collect $CO_2$ at concentrations higher than the bulk saturation concentration. Thus, when the wastewater is collected in the bulk phase, $CO_2$ spontaneously effervesces from the wastewater. In some embodiments, methods known to those of skill in the art may be used to speed the release of $CO_2$ from the waste water. For instance, the water in the tank may be agitated, or may be heated. In some embodiments, the $CO_2$ escapes from the water under ambient pressure, i.e., the pressure in the wastewater tank is not actively manipulated by a pump. In some embodiments, the $CO_2$ escapes from the water under ambient temperature, i.e., an active heating or cooling element is not present in association with the wastewater tank.

In some embodiments, the wastewater tank contains excess nucleation sites to aid with the release of $CO_2$ from the wastewater.

In some embodiments, a gas may be bubbled through the wastewater. In some embodiments, the gas may be $CO_2$. In other embodiments, the gas may be other than $CO_2$. Using $CO_2$ to agitate the wastewater provides agitation and additional surface area. Moreover, because the $CO_2$ in the wastewater is at a concentration above the equilibrium (saturation) concentration, bubbling $CO_2$ will not increase the concentration of $CO_2$ in the wastewater. Instead, the effect will be to aid release of $CO_2$ from the wastewater through agitation and providing additional surface area for $CO_2$ to escape from the supersaturated wastewater. In essence, bubbling $CO_2$ through the wastewater provides additional nucleation sites. Another advantage of using $CO_2$ bubbles to agitate the wastewater is that the gas collected will still be pure $CO_2$.

The wastewater may be routed through a number of fluid tanks as necessary or desired. For instance, the wastewater may be collected in a first fluid tank, then routed to a second fluid tank. In some embodiments, $CO_2$ is passively released from the wastewater in the first tank (i.e., without agitation or other means to speed release) and actively released from the wastewater in the second tank (e.g., with the aid of agitation). In some embodiments, the wastewater is actively released from the wastewater in both the first and the second tanks. Additional tanks may be added as desired. In some embodiments, multiple tank systems are used in parallel. For instance, there could be two parallel tank systems, each comprising a first, passive release, tank and a second, active release, tank.

In some embodiments, collecting carbon dioxide from the fluid comprises:

combining the fluid droplets in an airtight first fluid tank;
outgassing gaseous carbon dioxide from the fluid; and
directing the gaseous carbon dioxide to a carbon dioxide container.

The carbon dioxide container may be any suitable vessel. The carbon dioxide may be purified and compressed into the carbon dioxide container. In some embodiments, the carbon dioxide as collected is sufficiently pure for industrial applications, and further purification is not performed. In some embodiments, the only impurity in the carbon dioxide is water vapor, and the carbon dioxide is passed through a system for removing water vapor before being collected in the carbon dioxide container. Many systems for removing water vapor are known to those of skill in the art, and any appropriate one may be used.

After $CO_2$ outgassing, the wastewater may be recycled back through the $CO_2$ capture system. Optionally, the wastewater may be purified before being recycled. The purification may comprise, e.g., filtration and/or reverse osmosis.

Systems of the Disclosure

An aspect of the disclosure is a system for capturing carbon dioxide from a flue gas. In certain embodiments, the system captures large volumes of $CO_2$ gases in the wastewater stream. In some embodiments, the flue gas velocity is reduced. In other embodiments, the water spray flow is increased. In another embodiment, the wastewater is captured in a tank where minimal agitation causes $CO_2$ to separate from the water. In some embodiments, the system captures $CO_2$ as concentrated $CO_2$. For example, 80% of the $CO_2$ in the flue gas stream may be captured by the system and is at least 85% pure. In preferred embodiments, the recovered $CO_2$ is greater than 90% pure, or greater than 95% pure. In yet another embodiment, the concentrated $CO_2$ allows for a reduction in the size of the system. In still another embodiment, the concentrated $CO_2$ can be piped directly into another process without the need for compression. In another embodiment, the system is arranged as depicted in FIG. 2.

The wastewater tank(s) may be configured in a multitude of ways. In some embodiments, the system comprises one wastewater tank, which may further comprise an agitator. In some embodiments, the system comprises a settling tank, an aggravator tank, and a holding tank. In these embodiments, the aggravator tank comprises an agitator. The settling tank, when present, allows undesirable particulates that may have also been captures in the wastewater to settle out before agitation. In some embodiments, the system comprises multiple parallel arms of wastewater tanks, with each arm serving as a bi-directional conduit for fluid transfer. Each arm may comprise one tank, or may additionally comprise a settling tank, an aggravator tank, and a holding tank. In some embodiments, there are multiple parallel arms each comprising a settling tank and an aggravator tank, and the system further comprises one or more holding tanks. In any of the configurations described herein, the arms and tanks can be fluidly coupled with a closure mechanism (e.g. a valve) to selectively open and close fluid transfer, as so desired. Using multiple parallel arms can allow wastewater flows to be switched among the arms, allowing sufficient time for wastewater in each tank of each arm to be fully outgassed before ultimately being recycled through the system.

In the embodiments described above, the agitator may be any mechanism suitable for increasing the rate at which $CO_2$ dissolved in the wastewater is released into the gas phase. Several such types of agitators are described herein. For instance, the agitator may be a mechanical agitator such as a stirrer, a bubbler, or a source of additional nucleation sites for gas bubbles.

Some of the wastewater tanks described herein are linked to a $CO_2$ collection system. In preferred embodiments, these tanks are otherwise airtight so that when the system is in operation, the only gas in the tanks is $CO_2$. Being airtight prevents ambient air from entering into the tank and diluting the $CO_2$. Preferably, the settling and aggravator tanks described above contain $CO_2$ collection systems. However, depending on the needs of the overall system, one or the other may lack the $CO_2$ collection system. Moreover, one collection system may be spread across multiple tanks. In these embodiments, gas manifolds route $CO_2$ from each wastewater tank to the collection system. In some embodiments, the collection system comprises a dryer and a compressor, and is configured to produce $CO_2$ of sufficient purity for industrial use.

In other embodiments, depending on the characteristics of the flue gas and the nature of any upstream treatment, the system also captures or reduces at least one pollutant: HCl, HF, heavy metals (including mercury), NOx, SOx, or fine particulates. In another embodiment, the system reduces HCl, HF, $SO_2$, $SO_3$, mercury, and fine particulates. In yet another embodiment, the system reduces the particulate matter due to the nature of the disclosed condensation process. In certain embodiments, the wastewater is treated to remove these pollutants.

In another embodiment, the system captures both carbon dioxide and at least one pollutant from a flue gas within one unit. In another embodiment, the system comprises a unit for capturing carbon dioxide from a flue gas and a separate unit for capturing at least one pollutant. In some embodiments, the unit for capturing at least one pollutant has the arrangement of FIG. 1. In other embodiments, the unit for capturing at least one pollutant includes the carbon filter of FIG. 2.

In some embodiments, the system removes $SO_2$ by introducing hydrogen peroxide into the flue gas stream. In another embodiment, a reactor module in the system converts the $SO_2$ to sulfuric acid. In some embodiments, as the flue gas absorbs water, its temperature drops due to adiabatic cooling, and this reduction of temperature below the acid dew point allows sulfuric and other acids to condense out of the gas stream. In some embodiments, the specialized nozzles used in the system create fine fogging droplets and increase efficiency.

In certain embodiments, the nozzles are arranged to provide uniform distribution throughout the cross-section inside the system. The nozzles can be positioned a range of distances from the point at which the exhaust gas enters the vessel. In some embodiments the nozzles can be positioned approximately 4-5 feet from the exhaust gas entry point. In some embodiments the nozzles can be configured in a staggered or spaced relationship with a first subset of nozzles spaced a distance (from exhaust gas entry) that is different from a second subset of nozzles.

In another aspect, the disclosure provides a system for capturing carbon dioxide from a flue gas, the system comprising:

a gas conduit oriented along a first direction;

a plurality of nozzles disposed along a plurality of headers and oriented orthogonal to the flue gas stream, the nozzles adapted to dispense a fluid consisting essentially of water and configured to provide droplets, wherein 90% of the droplets have a size of less than approximately 50 microns.

Droplets of small sizes are desirable because they allow more efficient $CO_2$ capture than larger droplets. Without being bound by theory, it is believed that the greater surface area per volume of small droplets (e.g., with a diameter of less than approximately 100 microns, preferably less than approximately 50 microns) allows the droplets to absorb CO2 at concentrations greater than would be possible in the bulk phase according to Henry's law. It is possible that the surface of the droplets provides a favorable environment for $CO_2$ or carbonic acid to collect.

In some embodiments, the system is configured to provide droplets, wherein 90% of the droplets have a size of less than approximately 100 microns, less than approximately 80 microns, less than approximately 60 microns, less than approximately 50 microns, less than approximately 40 microns, less than approximately 30 microns, less than approximately 20 microns, or less than approximately 10 microns. In some embodiments, the system is configured to provide droplets, wherein 90% of the droplets have a size of less than approximately 60 microns, less than approximately 50 microns, less than approximately 40 microns, less than approximately 30 microns, less than approximately 20 microns, less than approximately 10 microns, less than approximately 5 microns, less than approximately 3 microns, or less than approximately 1 micron.

In another embodiment, the ratio of the amount of $CO_2$ collected by the fluid droplets compared to what would be expected based on Henry's Law is greater than 1. In still another embodiment, the ratio is between 1 and 10, between 1 and 20, between 1 and 50, or between 1 and 100. In yet another embodiment, the ratio is approximately 1.25, approximately 1.5, approximately 1.75, approximately 2, approximately 2.25, approximately 2.5, approximately 2.75, approximately 3, approximately 3.25, approximately 3.5, approximately 3.75, approximately 4, approximately 4.25, approximately 4.5, approximately 4.75, approximately 5, approximately 6, approximately 7, approximately 8, approximately 9, approximately 10, approximately 15, approximately 20, approximately 50, approximately 75, or approximately 100.

In some embodiments, the amount of $CO_2$ collected by the fluid droplets is greater than 30 g $CO_2$/kg $H_2O$. In some embodiments, the amount of $CO_2$ collected by the fluid droplets is greater than 50, 100, 150, 200, 225, or 250 g $CO_2$/kg $H_2O$. In some embodiments, the amount of $CO_2$ collected by the fluid droplets is between 30-300 g $CO_2$/kg $H_2O$. In some embodiments, the amount of $CO_2$ collected by the fluid droplets is between 50-300, 100-300, 150-300, 200-300, or 250-300 g $CO_2$/kg $H_2O$.

Dispensing droplets at subsonic speeds is advantageous in that the pressure differential at the nozzle orifice is lower than the systems described in WO 2015/024014. Consequently, the forces exhibited on the nozzle are reduced, allowing for a greater variety of mounting techniques of the nozzle. Additionally, the droplet exiting the nozzle is not exposed to the rapid change in pressure, temperature and entropy as encountered by supersonic systems. This allows for better control over droplet characteristics.

In certain embodiments of the systems described herein, the system is configured to spray the droplets from the nozzles at a droplet speed of less than Mach 1. In another embodiment, the relative velocity of the droplet is less than Mach 1, less than Mach 0.9, less than Mach 0.8, less than Mach 0.7, less than Mach 0.6, less than Mach 0.5, less than Mach 0.4, less than Mach 0.3, less than Mach 0.2, or less than Mach 0.1. In yet another embodiment, the relative velocity of the droplet is less than Mach 0.5.

In certain embodiments, the droplet speed is less than 65,000 ft/min. In other embodiments, the droplet speed is less than 60,000 ft/min. In other embodiments, the droplet speed is less than 50,000 ft/min, 40,000 ft/min, 30,000 ft/min, 20,000 ft/min, 10,000 ft/min, or 5,000 ft/min.

In another embodiment of the systems described herein, the system is configured to provide the gas at a temperature in the range of approximately 50° F. to approximately 350° F. In one embodiment, the gas is provided at a temperature of greater than 55° F. In another embodiment, the gas is provided at a temperature of greater than 60° F. In yet another embodiment, the gas is provided at a temperature of greater than 70° F. In still another embodiment, the gas is provided at a temperature of greater than 80° F. In certain embodiments, the gas is provided at a temperature of approximately 100° F., approximately 110° F., approximately 120° F., approximately 130° F., approximately 135° F., approximately 140° F., approximately 150° F., approximately 160° F., or approximately 170° F.

In still another embodiment of the systems described herein, the system further comprises, or is configured to provide, a wetted volume. The wetted volume may extend until the next gas treatment stage, if any, or may extend a certain distance from the nozzles. The wetted volume may extend from the nozzles in the direction of the spray, as well as in the direction of gas flow. The wetted volume may extend from upstream of the nozzles to downstream of the nozzles, and the extent of the wetted volume may depend on the rate of gas flow, the rate of fluid flow, and the droplet velocity. The wetted volume may be tuned based on these parameters, as well as others apparent to those of skill in the art, to optimize total carbon capture or carbon capture efficiency, depending on the application.

In some embodiments, the system comprises, or is configured to provide, a wetted volume with a droplet density of 15 gallons of fluid per 1000 cubic feet of gas, 12 gallons of fluid per 1000 cubic feet of gas, 11 gallons of fluid per 1000 cubic feet of gas, 10 gallons of fluid per 1000 cubic feet of gas, 9 gallons of fluid per 1000 cubic feet of gas, 8 gallons of fluid per 1000 cubic feet of gas, 7 gallons of fluid per 1000 cubic feet of gas, 6 gallons of fluid per 1000 cubic feet of gas, 5 gallons of fluid per 1000 cubic feet of gas, 4 gallons of fluid per 1000 cubic feet of gas, 3 gallons of fluid per 1000 cubic feet of gas, 2 gallons of fluid per 1000 cubic feet of gas, or 1 gallon of fluid per 1000 cubic feet of gas. In other embodiments, the wetted volume has a fluid droplet density of 10 gallons of fluid per 1000 cubic feet of gas.

In certain embodiments of the systems described herein, the system further comprises a flue gas stream.

In another embodiment of the systems described herein, the wetted volume has a fluid density of 15 gallons of fluid per 1000 cubic feet of gas, 12 gallons of fluid per 1000 cubic feet of gas, 11 gallons of fluid per 1000 cubic feet of gas, 10 gallons of fluid per 1000 cubic feet of gas, 9 gallons of fluid per 1000 cubic feet of gas, 8 gallons of fluid per 1000 cubic feet of gas, 7 gallons of fluid per 1000 cubic feet of gas, 6 gallons of fluid per 1000 cubic feet of gas, 5 gallons of fluid per 1000 cubic feet of gas, 4 gallons of fluid per 1000 cubic feet of gas, 3 gallons of fluid per 1000 cubic feet of gas, 2 gallons of fluid per 1000 cubic feet of gas, or 1 gallon of fluid per 1000 cubic feet of gas. In other embodiments, the wetted volume has a fluid density of 10 gallons of fluid per 1000 cubic feet of gas.

In some embodiments of the methods described herein, the liquid to gas ratio is less than 20 gallons per 1000 cubic foot, i.e. a liquid:gas ratio of 2.67:1000. In another embodiment, the liquid to gas ratio is less than 15 gallons per 1000 cubic foot, i.e. a liquid:gas ratio of 2.01:1000. In another embodiment, the liquid to gas ratio is less than 10 gallons per 1000 cubic foot, i.e. a liquid:gas ratio of 1.33:1000. In another embodiment, the liquid to gas ratio is less than 5 gallons per 1000 cubic foot, i.e. a liquid:gas ratio of 0.67:1000. In another embodiment, the liquid to gas ratio is less than 2 gallons per 1000 cubic foot, i.e. a liquid:gas ratio of 0.267:1000. In other embodiments, the liquid to gas ratio is 1:1000, 9:10,000, 8:10,000, 7:10,000, 6:10,000, 5:10,000, 4:10,000, 3:10,000, 2:10,000, or 1:10,000.

In further embodiments of the systems described herein, the system is configured to dispense the fluid at a rate of less than 15 gallons per minute (gpm) per 1000 cubic feet of gas, less than 12 gpm per 1000 ft$^3$ of gas, less than 10 gpm per 1000 ft$^3$ of gas, less than 9 gpm per 1000 ft$^3$ of gas, less than 8 gpm per 1000 ft$^3$ of gas, less than 7 gpm per 1000 ft$^3$ of gas, less than 6 gpm per 1000 ft$^3$ of gas, less than 5 gpm per 1000 ft$^3$ of gas, less than 4 gpm per 1000 ft$^3$ of gas, less than 3 gpm per 1000 ft$^3$ of gas, less than 2 gpm per 1000 ft$^3$ of gas, or less than 1 gpm per 1000 ft$^3$ of gas. In another embodiment, dispensing the fluid comprises dispensing the fluid at a rate of less than 10 gpm per 1000 ft$^3$ of gas.

In certain embodiments, the system is configured such that the flue gas has a residence time in the wetted volume of approximately less than 10 seconds, approximately less than 8 seconds, approximately less than 6 seconds, approximately less than 5 seconds, approximately less than 4 seconds, approximately less than 3 seconds, approximately less than 2 seconds, approximately less than 1 second, or approximately less than 0.5 seconds. In another embodiment, the gas has a residence time in the wetted volume of approximately less than 2 seconds.

In other embodiments of the systems described herein, the system is configured to provide the fluid at a temperature in the range of approximately 50° F. to approximately 350° F. In one embodiment, the fluid is provided at a temperature of greater than 55° F. In another embodiment, the fluid is provided at a temperature of greater than 60° F. In yet another embodiment, the fluid is provided at a temperature of greater than 70° F. In still another embodiment, the fluid is provided at a temperature of greater than 80° F.

In another embodiment of the systems described herein, the fluid consists essentially of water. In yet another embodiment of the systems described herein, the fluid is essentially free of amine.

In still another embodiment of the systems described herein, the nozzles include a single conduit for dispensing the fluid.

In other embodiments of the systems described herein, the nozzles are configured to spray the droplets in a direction opposite to the first direction. In another embodiment, the nozzles are configured to spray the droplets in the first direction. In some embodiments, the nozzles are configured to spray the droplets in a direction that is angled with respect to the first direction. The spray pattern may be a cone, a square cone, or any other spray pattern known in the art.

In other embodiments of the systems described herein, the array of nozzles includes between 1 and 20 headers inclusive. In another embodiment, the array of nozzles includes 5 headers, 6 headers, 7 headers, 8 headers, 9 headers, 10 headers, 11 headers, 12 headers, 13 headers, 14 headers, 15 headers, or 16 headers. In another embodiment, the array of nozzles includes 12 headers.

In yet another embodiment, the nozzles are configured in an array having:
  a first dispensing zone within the flue gas stream, the first dispensing zone including 3 headers,
  a second dispensing zone within the flue gas stream, the second dispensing zone including 2 headers,
  a third dispensing zone within the flue gas stream, the third dispensing zone including 2 headers,
  a fourth dispensing zone within the flue gas stream, the fourth dispensing zone including 2 headers,
  a fifth dispensing zone within the flue gas stream, the fifth dispensing zone including 3 headers.

In another embodiment of the systems described herein, each header includes at least 10 nozzles, at least 14 nozzles, at least 18 nozzles, at least 22 nozzles, at least 26 nozzles, or at least 30 nozzles. In some embodiments, each header includes at least 14 nozzles. In yet another embodiment, each header includes 12 nozzles, 14 nozzles, 16 nozzles, 18 nozzles, 20 nozzles, 22 nozzles, 24 nozzles, 26 nozzles, 28 nozzles, 30 nozzles, 32 nozzles, 33 nozzles, 34 nozzles, or 35 nozzles. In still another embodiment, each header includes 14 nozzles, 22 nozzles, 28 nozzles, 32 nozzles, or 33 nozzles.

In other embodiments of the systems described herein, a first nozzle on a header is spaced approximately 10 inches apart, approximately 11 inches apart, approximately 12 inches apart, approximately 13 inches apart, approximately 13.5 inches apart, approximately 14 inches apart, approximately 14.5 inches apart, or approximately 15 inches apart from a second nozzle. In another embodiment a first nozzle on a header is spaced approximately 12 inches apart, approximately 13 inches apart, approximately 13.5 inches apart, or approximately 14 inches apart from a second nozzle.

In some embodiments, the first dispensing zone includes:
  a first header having 14 nozzles, each nozzle spaced approximately 12 inches apart;
  a second header having 22 nozzles, each nozzle spaced approximately 14 inches apart; and
  a third header having 28 nozzles, each nozzle spaced approximately 13.5 inches apart.

In other embodiments of the systems described herein, a first header is spaced approximately 2.50 feet apart, approximately 2.75 feet apart, approximately 3 feet apart, approximately 3.25 feet apart, approximately 3.50 feet apart, approximately 3.75 feet apart, or approximately 4 feet apart from a second header. In another embodiment, a first header is spaced approximately 3 feet apart or approximately 3.25 feet apart from a second header. In yet another embodiment, the headers of the first dispensing zone are spaced approximately 3.25 feet apart.

In yet another embodiment, the second dispensing zone includes:
  a first header having 32 nozzles, each nozzle spaced approximately 13 inches apart;
  a second header having 33 nozzles, each nozzle spaced approximately 13.5 inches apart.

In still another embodiment, the headers of the second dispensing zone are spaced approximately 3 feet apart.

In other embodiments, the third dispensing zone includes:
a first header having 32 nozzles, each nozzle spaced approximately 14 inches apart;
a second header having 33 nozzles, each nozzle spaced approximately 14 inches apart.

In another embodiment, the headers of the third dispensing zone are spaced approximately 3 feet apart.

In some embodiments, the fourth dispensing zone includes:
a first header having 33 nozzles, each nozzle spaced approximately 13 inches apart;
a second header having 32 nozzles, each nozzle spaced approximately 13 inches apart.

In further embodiments, the headers of the fourth dispensing zone are spaced approximately 3 feet apart.

In certain embodiments, the fifth dispensing zone includes:
a first header having 28 nozzles, each nozzle spaced approximately 13.5 inches apart;
a second header having 22 nozzles, each nozzle spaced approximately 14 inches apart; and
a third header having 14 nozzles, each nozzle spaced approximately 12 inches apart.

In other embodiments, the headers of the fifth dispensing zone are spaced approximately 3.25 feet apart.

Figure 3A:
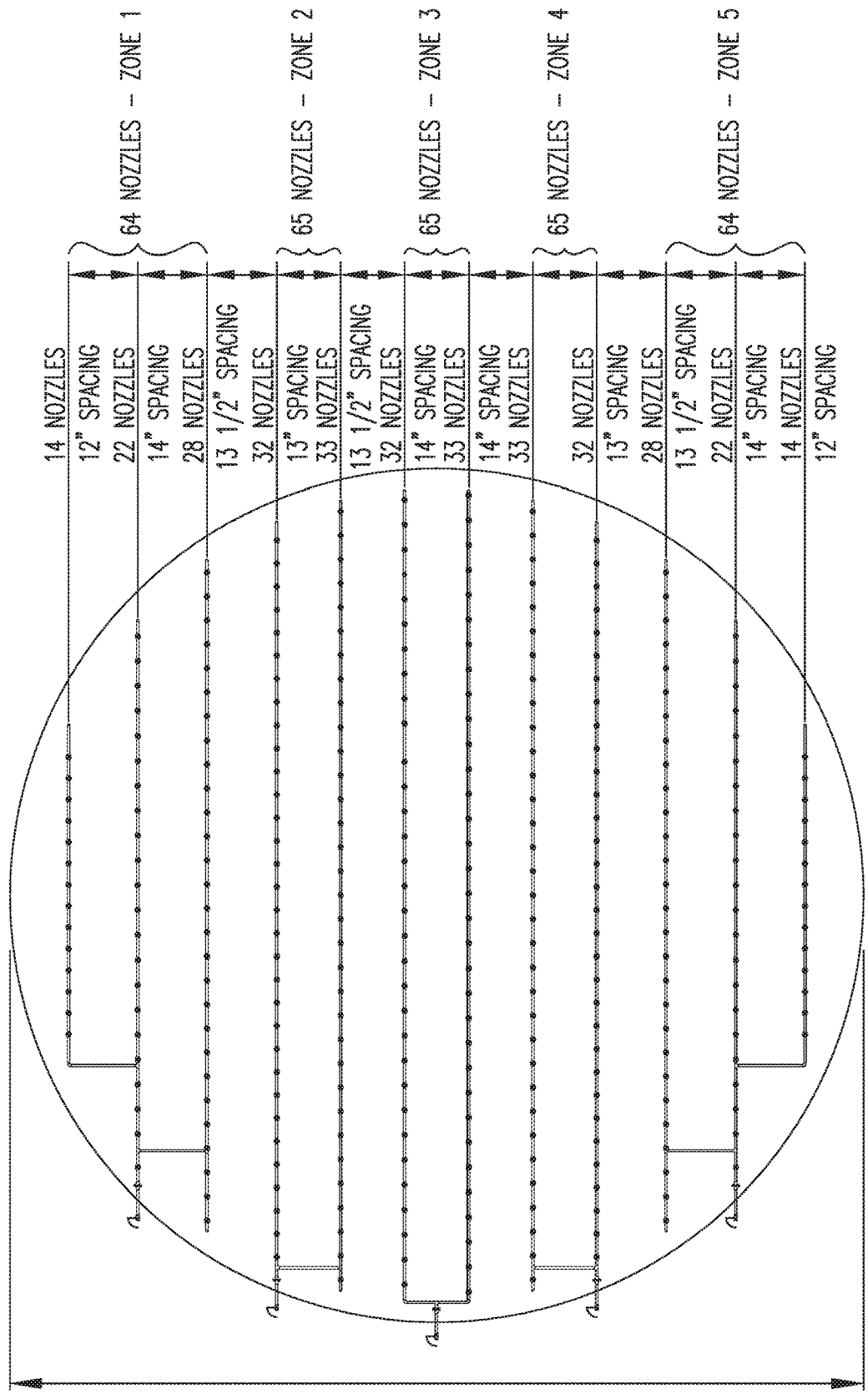
FIG. 3A shows an internal view of a flue gas stream depicting a plurality of headers and nozzles of an exemplary arrangement for a system of the disclosure capable of recovering $CO_2$ gases.
Figure 3B:
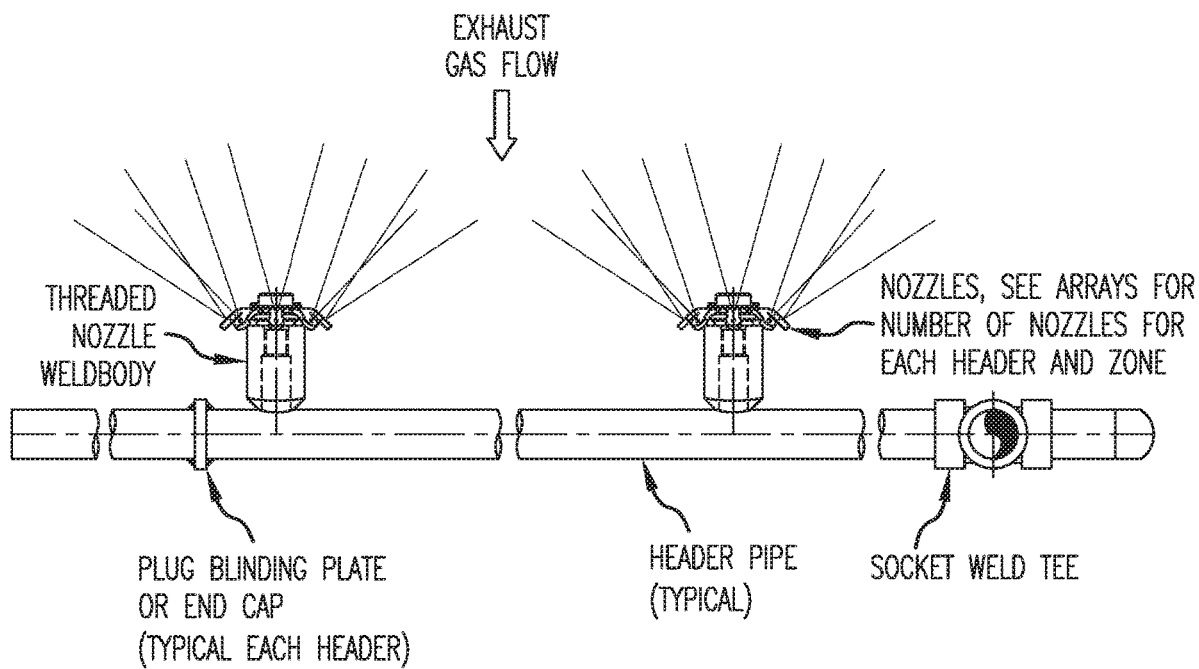
FIG. 3B shows a header and nozzle configuration of an exemplary arrangement for a system of the disclosure capable of recovering $CO_2$ gases.

In one embodiment, the header and nozzle configuration of the system is as depicted in FIG. 3A. In certain embodiments, the header assembly with nozzles of the system is as depicted in FIG. 3B.

In another embodiment, the three headers of the first dispensing zone are in fluid communication with each other.

In still another embodiment, the two headers of the second dispensing zone are in fluid communication with each other.

In yet another embodiment, the two headers of the third dispensing zone are in fluid communication with each other.

In a further embodiment, the two headers of the fourth dispensing zone are in fluid communication with each other.

In some embodiments, the three headers of the fifth dispensing zone are in fluid communication with each other.

In other embodiments of the systems described herein, each nozzle along a header is oriented at the same angle with respect to the header.

In another embodiment of the systems described herein, at least one nozzle is a multi-faceted nozzle comprising a plurality of orifices for dispensing the fluid. In yet another embodiment, the multi-faceted nozzle has a central axis, with at least one orifice disposed at an angle with respect to the central axis. In still another embodiment, at least one orifice is disposed at a 45° angle with respect to the central axis.

Figure 4:
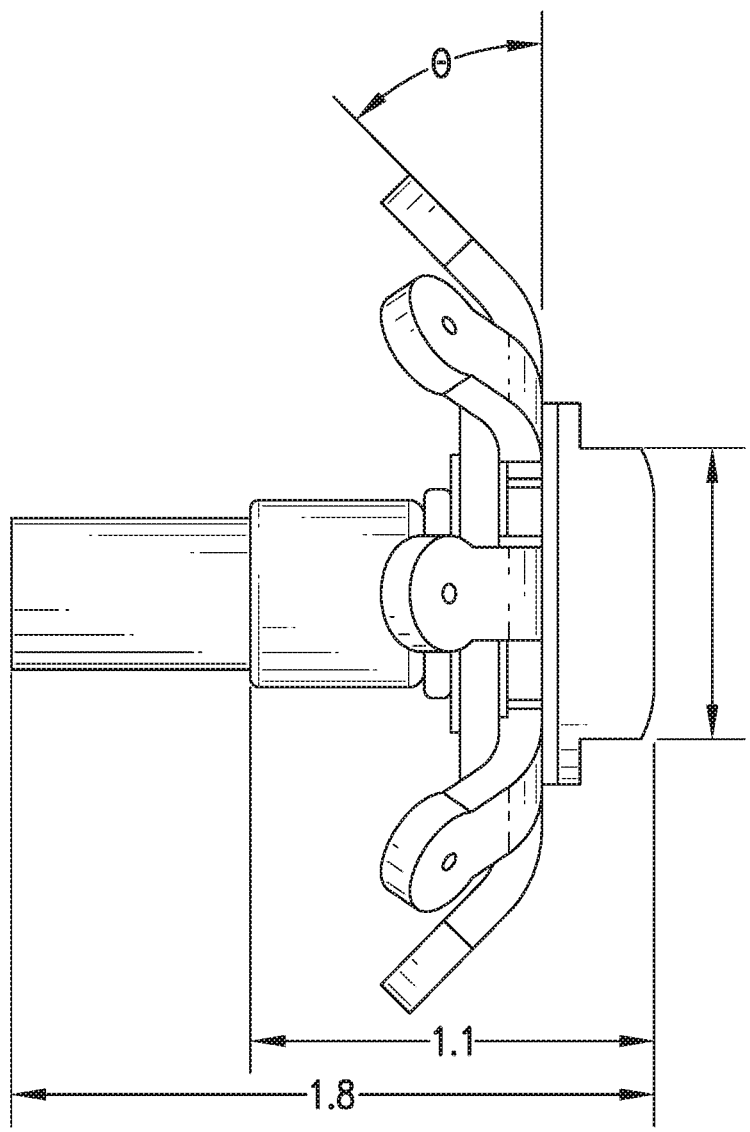
FIGS. 4-6 show an exemplary nozzle capable of recovering $CO_2$ gases for a system of the disclosure.
Figure 5:
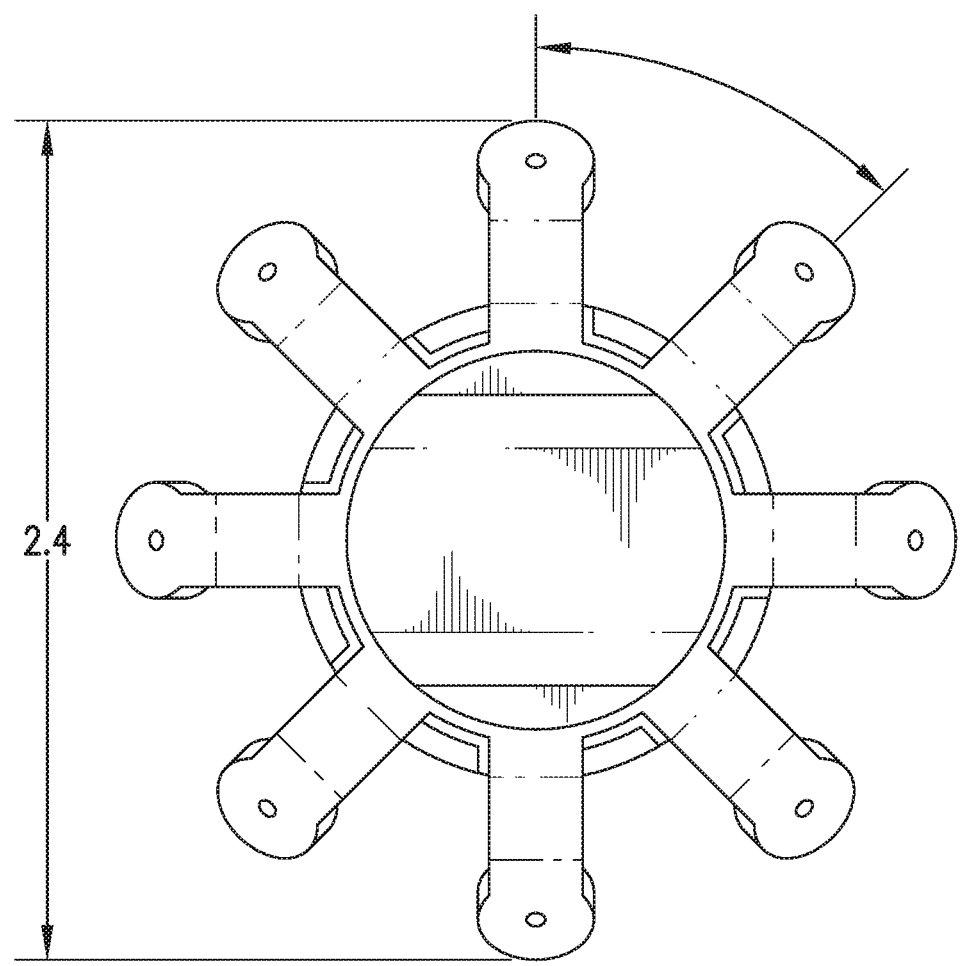
Figure 6:
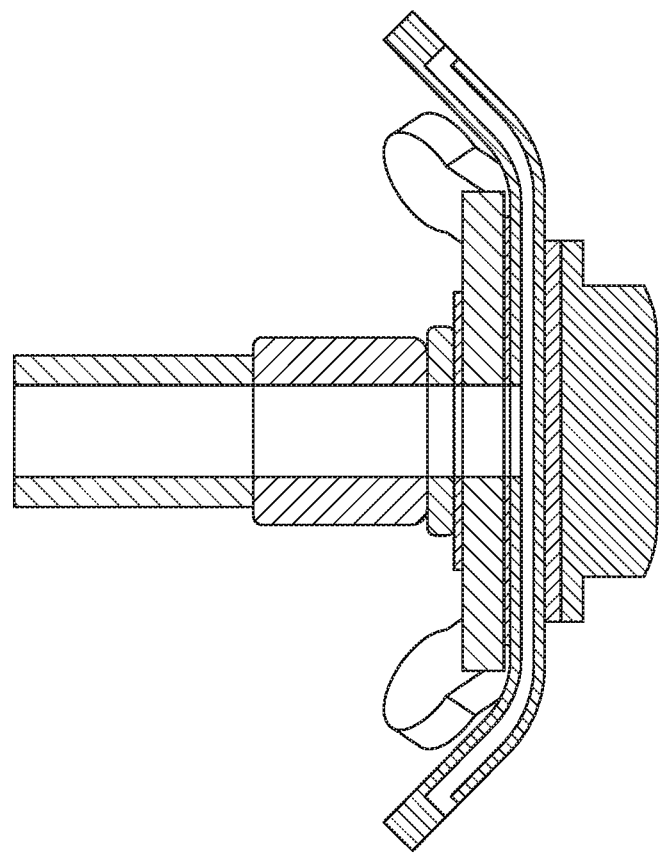

Additionally, the nozzles employed within the systems and techniques disclosed herein are configured with a single bore or conduit for receiving the fluid delivered from the header(s). This is in distinct contrast to the nozzles disclosed in WO 2015/024014 (such as those described in U.S. Pat. No. 5,454,518) which require a first bore or conduit for receiving a liquid and a second, perpendicular, conduit for receiving pressurized gas which in turn accelerates the liquid to supersonic speeds. Conversely, and as previously noted, the nozzles of the present disclosure dispense fluid at subsonic speeds. Furthermore, and in addition to the benefits discussed above, as the nozzles of the present disclosure, as shown in FIGS. 4-6, only require a single port or spigot to receive a single fluid supply, there is greater design and installation flexibility as compared to prior art nozzles. For example, the nozzles disclosed herein require fewer components (a single fluid delivery source) and thus coupling locations than the prior art which require discrete supplies of liquid and air. Additionally, the nozzles described herein do not require air be supplied at the elevated pressures disclosed in the prior art and thus do not require the presence of both a compressor (for delivering pressurized air) and separate pump (for delivering liquid).

Figure 7:
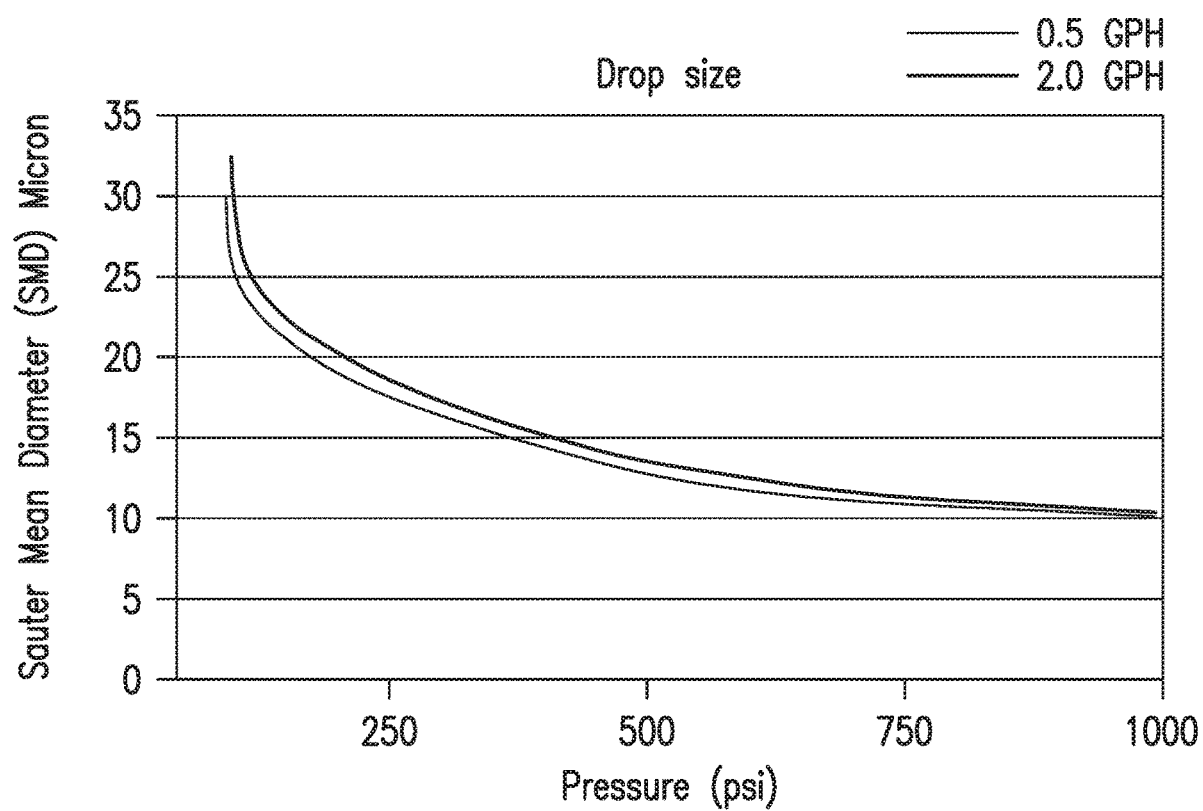
FIG. 7 shows a graphical representation of the nozzle droplet size for a system of the disclosure.
Figure 8:
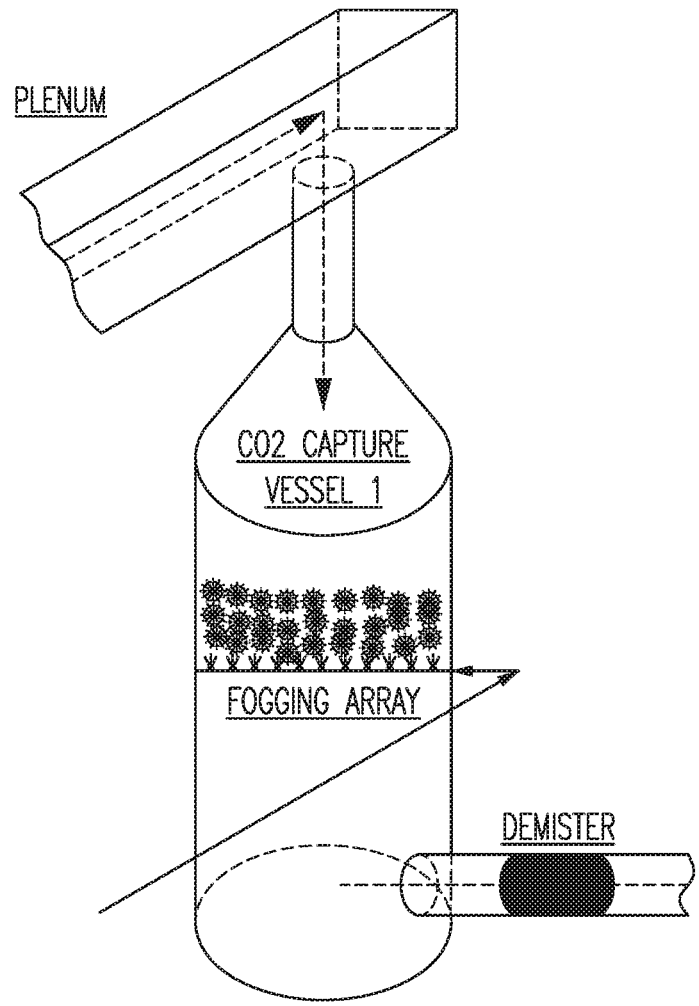
FIG. 8 shows a graphical representation of an exemplary $CO_2$ capture vessel and fogging array for a system of the disclosure.

In other embodiments, the orifice has a diameter of approximately 500 microns to approximately 10 microns. In some embodiments, the orifice has a diameter of approximately 500 microns to approximately 100 microns. In preferred embodiments the orifice has a diameter of approximately 200 microns to approximately 150 microns. In another embodiment, the orifice has a diameter of approximately 250 microns, approximately 200 microns, approximately 175 microns, approximately 150 microns, approximately 140 microns, approximately 130 microns, approximately 120 microns, approximately 110 microns, approximately 100 microns, approximately 90 microns, approximately 80 microns, approximately 70 microns, approximately 60 microns, approximately 50 microns, approximately 25 microns, or approximately 10 microns. In yet another embodiment, at least one orifice has a diameter of greater than 100 microns. FIG. 7 depicts a graphical representation of the range of diameters, pressure and flow rates applicable to the current disclosure.

In some embodiments of the systems described herein, a plurality of headers and a plurality of nozzles are in fluid communication with a common water supply conduit.

In another embodiment, each header has a distinct water supply conduit.

In some embodiments of the systems described herein, the plurality of headers have a diameter of approximately 6 inches, approximately 5 inches, approximately 4 inches, approximately 3 inches, approximately 2.5 inches, approximately 2.25 inches, approximately 2 inches, approximately 1.75 inches, approximately 1.5 inches, approximately 1.25 inches, approximately 1 inches, approximately 0.75 inches, approximately 0.5 inches, or approximately 0.25 inches. In yet another embodiment, the plurality of headers have a diameter of approximately less than 2 inches.

In other embodiments of the systems described herein, at least one header is configured with a non-linear geometry.

In another embodiment of the systems described herein, the headers are configured in an array having a uniform spacing between headers. In yet another embodiment, the headers are configured in an array having a non-uniform spacing between headers.

In still another embodiment of the systems described herein, the nozzles of a first header are configured with a uniform spacing between nozzles. In a further embodiment, the nozzles of a first header are configured with a non-uniform spacing between nozzles. For example, the nozzles and/or headers can be configured so that there is a greater amount of dispensing located at the center of the gas stream. In other words, for a fully developed gas stream, adjacent headers can be shaped (e.g. curved, converge/diverge, etc.) to be spaced closer together at the central portion of the gas stream (where the velocity of the gas stream will be greatest), and spaced further apart at the outer edges of the gas stream (where the velocity of the gas stream will be lowest due to the boundary layer interaction of the gas stream with the flue gas pipe/housing). Likewise, the nozzles can be arranged in a similar manner in which a greater number of nozzles are disposed at the central portion of the gas stream than at the outer edges of the gas stream.

Mechanistic Studies on CO$_2$ Capture

One potential mechanism for the CO$_2$ capture produced by the systems of the present disclosure is dissolution of CO$_2$ within the water droplets. The solubility of CO$_2$ in water is governed by Henry's law:

$$x_{CO_2} H = y_{CO_2} P \qquad 1$$

which is valid for liquid phase CO$_2$ concentrations up to 2 mol %. Experiments have been done to develop correlations for Henry's law coefficient as a function of temperature. Henry's law can be used to calculate a vapour-liquid partition coefficient K$_{VL}$ to describe the equilibrium relationship between molar concentrations of CO$_2$ in liquid phase [CO$_2$]$_L$ and vapour phase [CO$_2$]$_V$:

$$K_{VL,CO_2} = \frac{[CO_2]_V}{[CO_2]_L} \qquad 2$$

Dissolved CO$_2$ in water can react with H$_2$O to form H$_2$CO$_3$ and its ions. For a system with pH<7, the following reaction scheme applies:

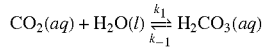

$$CO_2(aq) + H_2O(l) \underset{k_{-1}}{\overset{k_1}{\rightleftharpoons}} H_2CO_3(aq) \qquad 3$$

$$H_2CO_3(aq) \overset{K_2}{\rightleftharpoons} HCO_3^-(aq) + H^+(aq) \qquad 4$$

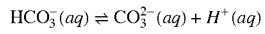

$$HCO_3^-(aq) \rightleftharpoons CO_3^{2-}(aq) + H^+(aq) \qquad 5$$

Figure 9:
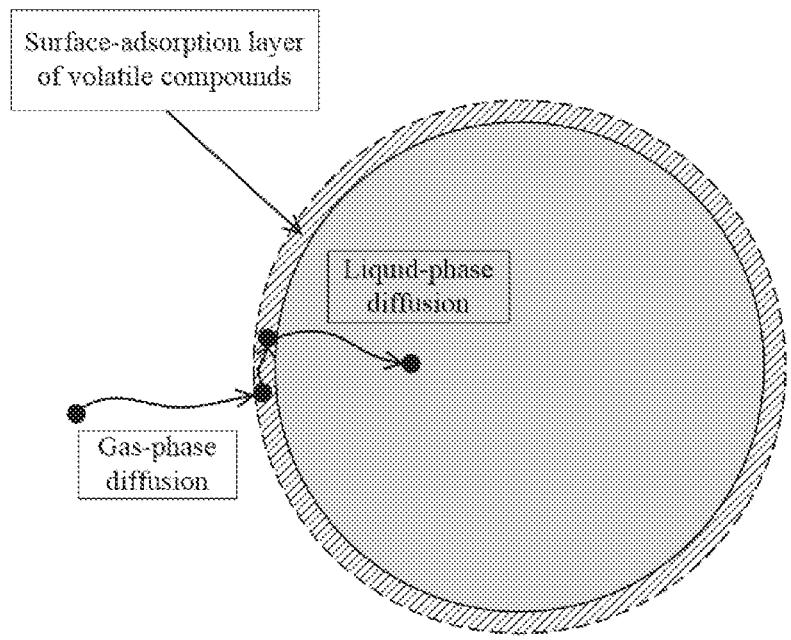
FIG. 9 shows a diagram of volatile compound adsorption and absorption by small water droplet.

Another way that CO$_2$ could be captured by micron-size water droplets is by adsorption on the outer surface of the droplet. As shown schematically in FIG. 9, volatile species can adsorb on the outer surface of a droplet and then diffuse toward the droplet centre. The amount of a volatile species S that can be adsorbed at equilibrium has been studied for a variety of species using an interface-liquid partition coefficient K$_{IL}$:

$$K_{IL,S} = \frac{\text{Concentration of } S \text{ adsorbed at the interface (mol/cm}^2)}{\text{Concentration of } S \text{ dissolved within the water droplet (mol/cm}^2)} = \frac{[S]_I}{[S]_L} \qquad 6$$

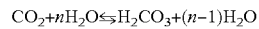

$$K_{IL,S} = 10^{(-8.58 - 0.769 \log [S]_L^{sat} - 2)} \qquad 7$$

where [S]$_L^{sat}$ is the hypothetical concentration of species S in the liquid phase that would be in equilibrium with pure S vapour at its pure component vapour pressure P$_S^{sat}$. To obtain [S]$_L^{sat}$, the vapour-liquid partition coefficient may be used:

$$K_{VL,S} = \frac{[S]_V^{sat}}{[S]_L^{sat}} = \frac{P_S^{sat}/RT}{[S]_L^{sat}} \qquad 8$$

with P$_S^{sat}$ obtained from the Antoine equation.

Another potential mechanism for capture of CO$_2$ by small water droplets is the propensity of some acidic species to congregate just inside the vapour-liquid interface. Some X-ray photoelectron spectroscopy studies have shown that carboxylic acids appear at higher concentrations in a very thin layer near the interface compared with their concentrations in bulk water. Also, some studies note that there is a higher propensity for carboxylic acid molecules to preferentially absorb at the interface when the concentration of acid is low in the bulk water droplet, because of the relatively higher availability of surface absorption sites. The situation is further complicated by the fact that the equilibrium dissociation of carboxylic acids into ions may be quite different near the interface than in the bulk water. However, it is not known whether this phenomenon applies to H$_2$CO$_3$, which is quite different in many regards from carboxylic acid.

Several other potential mechanisms may contribute to enhanced CO$_2$ removal by small water droplets: i) gas-phase reactions that lead to the formation of H$_2$CO$_3$; ii) surface reactions that form H$_2$CO$_3$ at the vapour-liquid interface and iii) congregation of dissolved CO$_2$ molecules on the liquid side of the droplet interface. Reaction of CO$_2$ with a single water molecule is far less favoured than reaction of CO$_2$ with gas-phase water clusters of size n where n=2, 3 or 4:

$$CO_2 + nH_2O \rightleftharpoons H_2CO_3 + (n-1)H_2O \qquad 9$$

This is because water has a catalytic effect on formation of H$_2$CO$_3$. Water clusters are known to form in the gas phase via hydrogen bonding, as are CO$_2$(H$_2$O)n complexes. Hydrated H$_2$CO$_3$ that forms in this manner may adsorb on the outer surface of the water droplets in the C-3 process, leading to enhanced CO$_2$ removal rates and enhanced equilibrium adsorption. Another recently proposed phenomenon that may enhance CO$_2$ removal occurs when vibrationally excited gas-phase CO$_2$ molecules collide with the surface of water droplets and react there to form H$_2$CO$_3$ (and its ions). In addition, some researches have suggested that H$_2$CO$_3$ dissociates faster at the interface than in the bulk liquid, which further complicates the situation. Furthermore, within the aqueous phase, dissolved CO$_2$ can behave as a hydrophobic solute, which may, like other hydrophobic solutes, tend to congregate in the liquid phase near the water droplet surface. Finally, since H$_2$CO$_3$ is neither a mono-nor dicarboxylic acid it may not behave similarly to carboxylic acids in the aqueous phase and may have a greater or lesser propensity than carboxylic acids to congregate at the water/vapour interface. In summary, complex mechanisms related to interactions between CO$_2$ and water surfaces are not yet well understood. In a recent review article, Taifan et. al concluded that "the actual mechanisms of the incorporation of CO$_2$ into the fluid phase continue to be elusive. Most particularly, the air/water interface plays a primordial role in this process". Consequently, further experimental investigation is required to better understand the potential importance of these various phenomena during CO$_2$ capture via small water droplets.

Because the capture of CO$_2$ by small water droplets is a dynamic rather than equilibrium process, it is important to account for associated mass and heat-transfer phenomena when modeling CO$_2$ capture. Heat and mass transfer have been studied within the gas phase, within the liquid phase and at the vapour-liquid interface. For transfer from the gas phase to a liquid surface, many correlations for predicting Nusselt number Nu and Sherwood number Sh have been developed. For example, the correlations of Ranz and Marshall:

$$Nu = 1 + 0.6 Re^{\frac{1}{2}} Pr^{\frac{1}{3}} \quad \text{10a}$$

$$Sh = 2 + 0.6 Re^{\frac{1}{2}} Sc^{\frac{1}{3}} \quad \text{10b}$$

have been widely used in various studies on heat and mass transfer to or from non-vaporizing droplets or bubbles. Equations 10a and 10b can be used to calculate the convective heat transfer coefficient $h_V$ and convective mass transfer coefficient $k_{mS,VL}$ of species S in the vapour phase using the droplet diameter $d_d$, thermal conductivity $k_V$ and gas-phase diffusivity $D_S$ of species S using appropriate expressions for the Nusselt number $$Nu = \frac{h_V d_d}{k_V},$$

Prandtl number $$Pr = \frac{\mu_V / \rho_V}{k_V / (\rho_V C_{p_V})}, \quad Sh = \frac{k_{mS,VL} d_d}{D_S},$$

Schmidt number $$Sc = \frac{\mu_V}{\rho_V D_S}$$

and Reynolds number $$Re = \frac{\rho_V u d_d}{\mu_V}.$$

For a system that have low Reynolds number, alternative correlations are recommended:

$$Nu = 1 + (1 + RePr)^{\frac{1}{3}} f(Re) \quad \text{11a}$$

$$Sh = 1 + (1 + ReSc)^{\frac{1}{3}} f(Re) \quad \text{11b}$$

where $f(Re)=1$ for $Re \leq 1$ and $f(Re)=Re^{0.077}$ for $Re \leq 400$. Abramzon and Sirignano introduced correction factors for Nu and Sh, that take into account the effects of Stefan flow in the gas phase (the flow caused by evaporation, absorption, and/or adsorption of chemical species) on heat and mass transfer involving an evaporating droplet. As a result, they may be useful for predicting heat transfer and water mass transfer in situations where there is significant water evaporation from the droplets during $CO_2$ absorption. To our knowledge, no experimental studies have been performed to determine vapour-side heat or mass-transfer coefficients during $CO_2$ adsorption or absorption by small water droplets.

The following is a preliminary mathematical model to investigate and explain the adsorption/absorption of $CO_2$ by micron-size water droplets. First, equilibrium calculations are performed to determine the amounts of $CO_2$ that would be captured by micron-size water droplets via: i) dissolution of $CO_2$ within the water droplet, ii) conversion of dissolved $CO_2$ to $H_2CO_3$, iii) adsorption of $CO_2$ on the droplet surface and iv) congregation of $H_2CO_3$ molecules near the droplet surface. Next, a dynamic model is derived and used to gain an improved understanding of mass-transfer and reaction rates.

Preliminary Equilibrium Calculations

In this calculation, the water droplets are assumed to be in equilibrium with diluted flue gas with the composition shown in Table 1. The solubility of $CO_2$ in water is governed by Henry's law (equation 1) where the temperature-dependent expression for the Henry's law constant H (in Pa) is provided in Table 2.

TABLE 1

| Diluted flue gas composition | |
|---|---|
| Components | Molar fraction |
| $CO_2$ | 0.04 |
| $H_2O$ | 0.05 |
| $O_2$ | 0.15 |
| $N_2$ | 0.76 |

TABLE 2

| Algebraic equations for computing model parameters | |
|---|---|
| Equations | No. |
| $H = \exp\left(-6.8346 + \frac{1.2817 * 10^4}{T} - \frac{3.7668 * 10^6}{T^2} + \frac{2.997 * 10^8}{T^3}\right) * 10^6$ | 2.1 |
| $k_1[H_2O] = 1.28 * 10^{11} * e^{\frac{-8.12 * 10^4}{R_{cons}T}} * 55.6$ | 2.2 |
| $k_{-1} = 9.2 * 10^{13} * e^{\frac{-7.17 * 10^4}{R_{cons}T}}$ | 2.3 |
| $K_2 = \frac{10^{\frac{-5251.43}{T} - 36.7816 * \log T + 102.2685}}{k_1/k_{-1}} \frac{mol}{L} \cdot 1000 \frac{L}{m^3}$ | 2.4 |

TABLE 2-continued

Algebraic equations for computing model parameters

| Equations | No. |
|---|---|
| $P_{CO_2}^{sat} = 10^{7.58828 - \frac{861.82}{271.883+T}} mmHg \cdot \frac{101325 \text{ Pa}}{760 \text{ mmHg}}$ | 2.5 |
| $k_{mCO_2,VL} = \frac{Sh_V D_{CO_2,V}}{2R}$ | 2.6 |
| $Sh_V = 2 + 0.6 \, Re^{\frac{1}{2}} Sc^{\frac{1}{3}}$ | 2.7 |
| $\mu_V = \frac{1.425 \ast 10^{-6} \ast T^{0.5039}}{1 + \frac{108.3}{T}}$ | 2.8 |
| $D_{CO_2,V} = \frac{1 - y_{CO_2}}{\sum \frac{y_j}{D_{CO_2-j,V}}}$ | 2.9 |
| $D_{CO_2-j,V} = \frac{1 \ast 10^{-9} \ast T^{1.75}}{\frac{P}{101325}\left[(\sum v)_{CO_2}^{1/3} + (\sum v)_j^{1/3}\right]^2} \left(\frac{1}{1000 \, M_{CO_2}} + \frac{1}{1000 \, M_j}\right)^{0.5}$ | 2.10 |
| $D_{CO_2} = 14.6836 \ast 10^{-9} \left[\frac{T}{217.2056} - 1\right]^{1.997}$ | 2.11 |
| $D_{H_2CO_3,T} \approx D_{HCO_3^-} = 7.0158 \ast 10^{-9}\left[\frac{T}{204.0282} - 1\right]^{2.3942}$ | 2.12 |
| $[CO_2]_{LI}^* = \frac{[CO_2]_I}{K_{IL,CO_2}}$ | 2.13 |
| $[H_2CO_{3,T}]_{LI}^* = \frac{[H_2CO_{3,T}]_I}{K_{IL,H_2CO_{3,T}}}$ | 2.14 |

Figure 10:
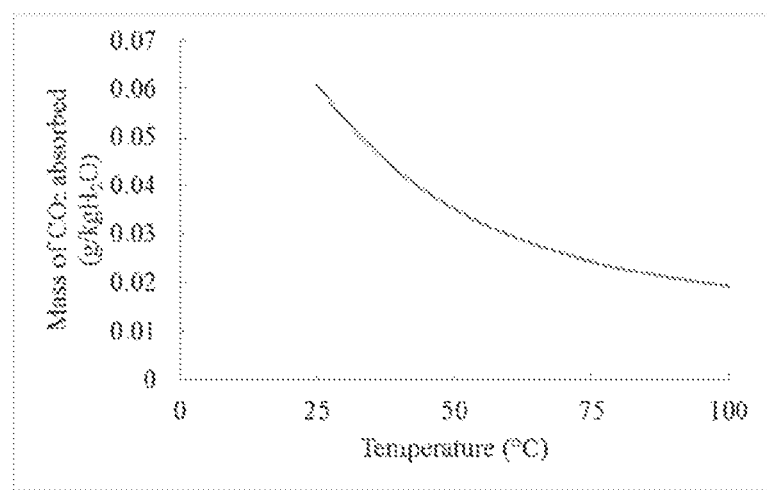
FIG. 10 shows the effect of temperature on equilibrium dissolution of $CO_2$ in water.

As shown in FIG. 10, the amount of $CO_2$ that could be absorbed in bulk liquid water decreases as temperature increases. For example, the equilibrium amount of absorbed $CO_2$ is 0.06 g of $CO_2$ per kg of water at 25° C., which is 3 times higher than that at 100° C. These amounts do not account for $CO_2$ that is converted to $H_2CO_3$ and its ions nor for $CO_2$ and $H_2CO_3$ adsorption/absorption at the droplet surface.

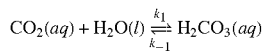   3

   4

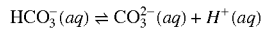   5

Figure 11:
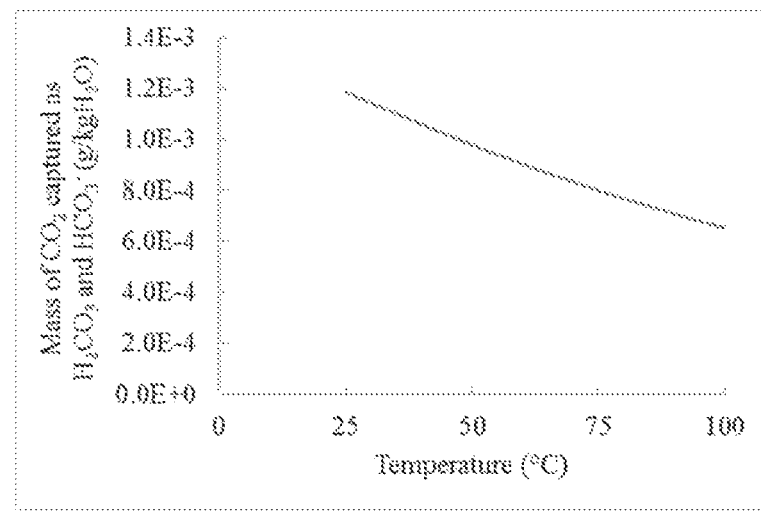
FIG. 11 shows the effect of temperature on equilibrium $H_2CO_3$ and $HCO_3^-$ formation.

Consider the formation of $H_2CO_3$ and its ions from $CO_2$ and $H_2O$ via reactions 3 to 5. The concentration of $CO_3^{2-}$ produced from reaction 5 can be neglected because it will be small compared to $[H_2CO_3]_L$ and $[HCO_3^-]_L$. Table 2 provides Arrhenius expressions for the forward and reverse rate constants for reaction 3 (i.e., $k_1$ and $k_{-1}$) and for equilibrium constant $K_2$ for reaction 11. The additional equilibrium amount of $CO_2$ captured via this mechanism is plotted in FIG. 11 as a function of temperature. The amount of $CO_2$ within the droplets that would be converted into $H_2CO_3$ and $HCO_3^-$ is higher at lower temperature where the concentration of dissolved $CO_2$ is higher.

Note that the expressions for $k_1$ and $k_{-1}$ in Table 2 were obtained from experimental results in a temperature range of 6.6 to 42.8° C. Therefore, extrapolation was required to obtain the results shown in FIG. 11.

Figure 12:
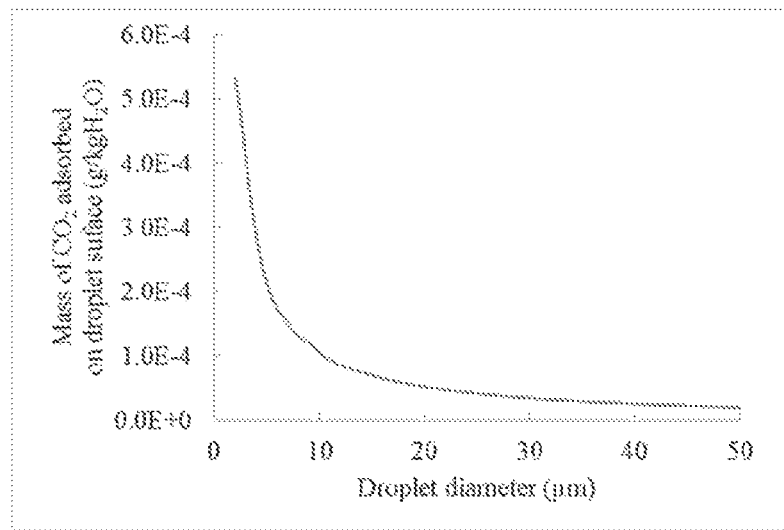
FIG. 12 shows the effect of droplet size on equilibrium $CO_2$ surface-adsorption.

The third proposed mechanism is the adsorption of $CO_2$ on the surface of water droplets. To obtain a crude estimate of the equilibrium amount of $CO_2$ that might be adsorbed on the surface of water droplets (in g $CO_2$/kg $H_2O$) at 25° C., equations 2, 8, 7 and 6 were used consecutively, in which $[CO_2]_V$, $[CO_2]_L$ and $P_{CO_2}^{sat}$ were obtained using the composition in Table 1, Henry's law, the ideal gas law and the Antoine equation. $[CO_2]_I$ calculated from equation 6 (approximately $4 \cdot 10^{-9}$ mol/m²) can then be used to calculate the equilibrium mass of $CO_2$ adsorbed per kg of water used. FIG. 12 shows the resulting predicted mass of adsorbed $CO_2$ per kg of water obtained using different droplet diameters. It can be seen that the amount of adsorbed $CO_2$ dramatically increases as droplet size decreases (e.g., the amount of $CO_2$ that is adsorbed by 2 μm-diameter droplets at equilibrium is 25 times higher than that by 50 μm-diameter droplets) due to the increase in surface area per unit volume.

Note that the results in FIG. 12 rely on the correlation in equation 7, which was obtained from experiments on relatively high molecular weight species that are much less volatile than $CO_2$. As a result, equation 7 may greatly under- or over-predict the amount of $CO_2$ adsorbed on the surface of small water droplets. FIG. 12 also ignores any gaseous $H_2CO_3$ that might be adsorbed on the outer surface of the droplets.

The fourth proposed mechanism for capturing $CO_2$ is the additional absorption of $H_2CO_3$ and its ions just inside the surface of water droplets. Equilibrium concentrations of a variety of carboxylic acids have been measured near the surface of aqueous solutions using X-ray photoelectron spectroscopy. Unfortunately, there has been no similar study on $H_2CO_3$ at liquid water surfaces. Thus, the equilibrium amount of additional $H_2CO_3$ and $HCO_3^-$ just inside the surface of water droplets cannot be estimated reliably.

In summary, the amount of $CO_2$ that is captured by small water droplets in the C-3 process cannot readily be explained by equilibrium calculations using the mechanisms proposed above. To better understand the dynamics of the $CO_2$ adsorption/absorption process via these mechanisms, a mathematical model is developed and shown in the next section where mass transfer is taken into account.

Dynamic Model Calculations

In the next theoretical study, a simple case is studied in which a spherical water droplet of radius R is surrounded by flue gas. The water droplet captures $CO_2$ from the flue gas via four proposed mechanisms: i) dissolution of $CO_2$ in water, ii) conversion of $CO_2$ to $H_2CO_3$ and its ions, iii) adsorption of $CO_2$ on the water droplet surface and iv) congregation of $H_2CO_3$ just inside the droplet surface. A mathematical model that accounts for the proposed $CO_2$ capture mechanisms was developed based on the assumptions listed in Table 3 below. Algebraic equations required to compute parameters that appear in the model equations are provided in Table 2.

Figure 13:
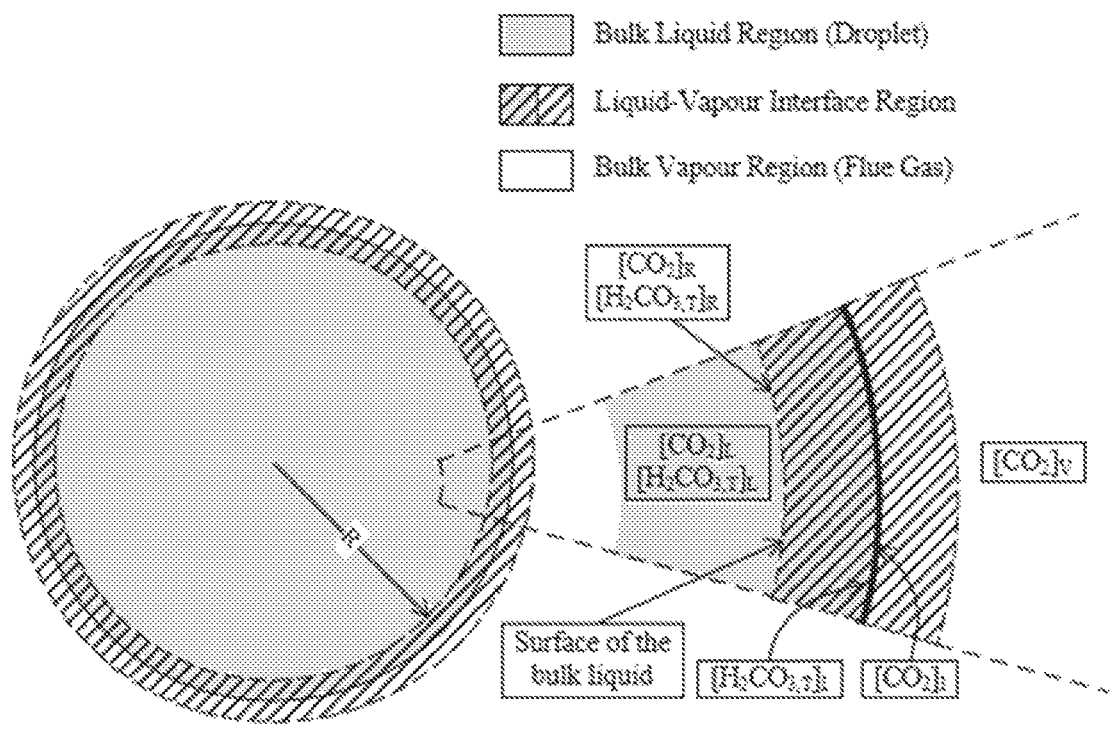
FIG. 13 shows a schematic diagram of water droplet used in the second model.

FIG. 13 shows three regions that were considered in this model (i.e., the bulk liquid region within the droplet, the vapour-liquid interface region, and the bulk vapour region). As the vapour-liquid interface is treated as a separate region where species can accumulate, the mass transfer resistance within the interface is also taken into account in the model using a fraction $f_{mI}$ defined as:

$$f_{ml} = \frac{\text{Interfacial mass-transfer resistance}}{\text{Total mass-transfer resistance between vapour and surface of bulk liquid}} \quad 12$$

Decomposing the total resistance to mass transfer between the flue gas and the bulk liquid surface into two parts gives the following expression:

$$\frac{1}{k_{mCO_2,VL}} = \frac{1-f_{ml}}{k_{mCO_2,VL}} + \frac{f_{ml}}{k_{mCO_2,VL}} \quad 13$$

where the first term on the right-hand side is the resistance within the gas phase and the second is the resistance at the interface.

Partial differential equations (PDEs) derived for this model are shown in Table 4, in which r is the radial position within the water droplet, $[H_2CO_{3,T}]_L$ is total concentration of $H_2CO_3$ in the liquid phase (i.e., $[H_2CO_{3,T}]_L=[H_2CO_3]_L+[HCO_3^-]_L$). Equation 4.1 is a material balance on $CO_2$ within the bulk liquid in the droplet. On the right-hand side of equation 4.1, the first term describes the diffusion of $CO_2$ within the droplet. The second and the third terms account for formation and consumption of dissolved $CO_2$, respectively. Initially, the concentration of $CO_2$ inside the water droplet is assumed to be very low as shown in equation 4.1a. To solve equation 4.1, boundary conditions are also required. At the centre, the concentration of $CO_2$ is at a minimum value within the droplet as described by equation 4.1b. Equation 4.1c is a material balance on $CO_2$ at the surface of the bulk liquid region, in which, $[CO_2]_{LI}^*$ is

TABLE 3

| Assumptions used in model development | |
| --- | --- |
| Simplifying Assumptions | No. |
| Henry's law applies and can be used to predict the equilibrium concentration of $CO_2$ within the liquid droplet that would be in equilibrium with the vapour phase $\left(\text{i.e., } [CO_2]_{LV}^* = \frac{y_{CO_2} P \rho_{H_2O}}{H \, M_{H_2O}}\right)$ | 3.1 |
| Flue gas contains only $N_2$, $O_2$, $H_2O$, and $CO_2$. Species at lower concentrations in the flue gas (e.g., $SO_2$, $NO_2$, NO, $H_2SO_4$, and $HNO_3$) are neglected | 3.2 |
| Water droplets and the flue gas are at the same temperature which is constant. Heat transfer is neglected. | 3.3 |
| Shrinkage of the water droplet due to water evaporation is neglected | 3.4 |
| Composition of the flue gas is constant over time and position | 3.5 |
| Internal circulation within the droplet is neglected | 3.6 |
| Reaction between $CO_2$ and $H_2O$ to produce $H_2CO_3$ in the gas phase and on the water surface are neglected | 3.7 | hypothetical concentration of $CO_2$ in the bulk liquid region that would be in equilibrium with the interface region.

TABLE 4

Model equations for $CO_2$ adsorption/absorption process in a single water droplet

| Equations | No. |
|---|---|
| $\frac{\partial [CO_2]_L}{\partial t} = \frac{D_{CO_2}}{r^2} \frac{\partial}{\partial r}\left(r^2 \frac{\partial [CO_2]_L}{\partial r}\right) + k_{-1}([H_2CO_{3,T}]_L - [HCO_3^-]_L) - k_1[H_2O]_L[CO_2]_L$ | 4.1 |
| Initial condition: $[CO_2]_{L,0} = 0$ | 4.1a |
| Boundary conditions: $\left.\frac{\partial [CO_2]_L}{\partial r}\right|_{r=0} = 0$ | 4.1b |
| $\left.\frac{\partial [CO_2]_L}{\partial r}\right|_{r=R} = \frac{k_{mCO_2,VL}/f_{ml}}{D_{CO_2}}([CO_2]_{LI}^* - [CO_2]_R)$ | 4.1c |
| $\frac{\partial [H_2CO_{3,T}]_L}{\partial t} = \frac{D_{H_2CO_{3,T}}}{r} \frac{\partial}{\partial r}\left(r^2 \frac{\partial [H_2CO_{3,T}]_L}{\partial r}\right) + k_1[H_2O]_L[CO_2]_L - k_{-1}([H_2CO_{3,T}]_L - [HCO_3^-]_L)$ | 4.2 |
| Initial condition: $[H_2CO_{3,T}]_{L,0} = 0$ | 4.2a |
| Boundary conditions: $\left.\frac{\partial [H_2CO_{3,T}]_L}{\partial r}\right|_{r=0} = 0$ | 4.2b |
| $\left.\frac{\partial [H_2CO_{3,T}]_L}{\partial r}\right|_{r=R} = -\frac{k_{mH_2CO_{3,T},LI}}{D_{H_2CO_{3,T}}}([H_2CO_{3,T}]_{LI}^* - [H_2CO_{3,T}]_R)$ | 4.2c |
| $\frac{\partial [CO_2]_I}{\partial t} = \frac{k_{mCO_2,VL}}{1 - f_{ml}}([CO_2]_{LV}^* - [CO_2]_{LI}^*) - \frac{k_{mCO_2,VL}}{f_{ml}}([CO_2]_{LI}^* - [CO_2]_R)$ | 4.3 |
| Initial condition: $[CO_2]_{I,0} = 0$ | 4.3a |
| $\frac{\partial [H_2CO_{3,T}]_I}{\partial t} = -k_{mH_2CO_{3,T},LI}([H_2CO_{3,T}]_{LI}^* - [H_2CO_{3,T}]_R)$ | 4.4 |
| Initial condition: $[H_2CO_{3,T}]_{I,0} = 0$ | 4.4a |

Similarly, a PDE for $[H_2CO_{3,T}]_L$ is shown in equation 4.2 to account for diffusion and reaction of $[H_2CO_{3,T}]_L$ within the droplet. Initially, it is assumed that $[H_2CO_{3,T}]_L$ is zero as shown in equation 4.2a. In boundary condition (4.2c), $[H_2CO_{3,T}]_{LI}^*$ is the hypothetical concentration of $H_2CO_{3,T}$ in the bulk liquid region that would be in equilibrium with the interface region and $k_{mH_2CO_{3,T},LI}$ is the mass transfer coefficient of $H_2CO_{3,T}$ between the interface and the surface of the bulk liquid region.

Ordinary differential equation (ODE) 4.3 is a material balance on the $CO_2$ that adsorbs on droplet surface (and absorbs in the interfacial liquid layer). The amount of $CO_2$ that accumulates depends on the rate of $CO_2$ mass transfer from the bulk vapour to the interface region and on the rate of mass transfer from the interface to the bulk liquid surface. Similarly, ODE 4.4 is a material balance on $H_2CO_3$ (and its ions) within the interface region. Note that chemical reactions at the interface are ignored (assumption 3.7).

The model presented in the Table 4 was solved numerically. The settings shown in Table 5 were used to perform a sensitivity analysis to investigate the influence of the following adjustable parameters: i) velocity of the water droplet relative to the flue gas (u), ii) fraction of mass-transfer resistance within the interface ($f_{mI}$), iii) radius of the water droplet (R), iv) temperature (T), v) $CO_2$ partition coefficient between the interface and the liquid ($K_{IL,CO_2}$), and vi) $H_2CO_3$ partition coefficient between the interface and the liquid ($K_{IL,H_2CO_3}$). The velocity of the water droplet was studied because it influences the convective mass transfer coefficient $k_{mCO_2,VL}$. Note that values of $K_{IL,CO_2}$ and $K_{IL,H_2CO_3}$ have not been determined experimentally. Thus, the values used for the base-case simulation (Table 5) are based on other studies that focused on volatile organic compounds and carboxylic acids. Lower and upper values in Table 5 indicate the range of values considered in this simulation study.

TABLE 5

Settings for model simulations

| Adjustable Parameters | Base Values | Lower Values | Upper Values | Units |
|---|---|---|---|---|
| Velocity of the water droplet (u) | 0 | 0 | 160 | m/s |
| Fraction resistance within the interface ($f_{ml}$) | 0.5 | 0.1 | 0.9 | — |
| Radius of the water droplet (R) | 2.5 | 0.5 | 4.5 | um |
| Temperature (T) | 62.5 | 25 | 100 | ° C. |

TABLE 5-continued

Settings for model simulations

| Adjustable Parameters | Base Values | Lower Values | Upper Values | Units |
|---|---|---|---|---|
| Interfacial $CO_2$ partition coefficient ($K_{IL,CO_2}$) | $1 \cdot 10^{-9}$ | $1 \cdot 10^{-11}$ | $1 \cdot 10^{-3}$ | m |
| Interfacial $H_2CO_3$ partition coefficient ($K_{IL,H_2CO_3}$) | $1 \cdot 10^{-8}$ | $1 \cdot 10^{-10}$ | $1 \cdot 10^{-2}$ | m |

Figure 14:
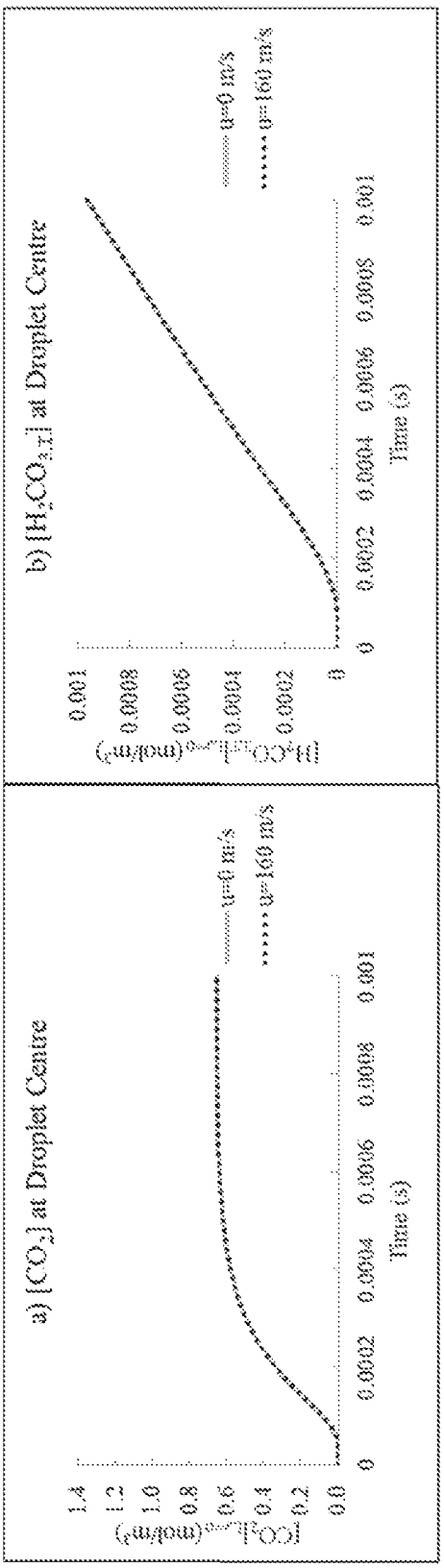
FIG. 14 shows the predicted dynamic behaviour of $[CO_2]_L$ and $[H2CO_3, T]_L$ at the droplet centre obtained using base-case settings and a range of droplet velocities.
Figure 15:
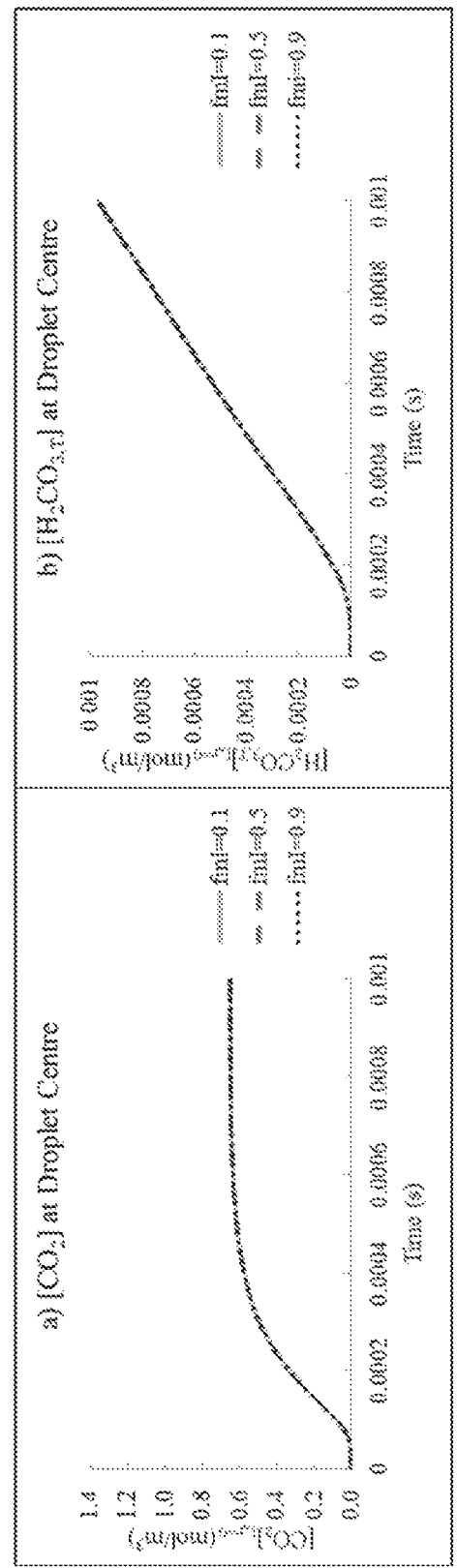
FIG. 15 shows the predicted dynamic behaviour of $[CO_2]L$ and $[H_2CO_3, T]_L$ at the droplet centre obtained using base-case settings and a range of values of fraction resistance within the interface.

FIG. 14 shows simulation results obtained when the velocity of the water droplet is adjusted, with other parameters held at their base-case values in Table 5. No noticeable difference in the dynamic behaviour of concentrations within the droplet is predicted because the main resistance to mass-transfer for droplets with R=2.5 μm is within the droplet rather than in the gas phase or at the interface. Note that $[H_2CO_{3,T}]_L$ reaches an equilibrium value of 0.02 mol/m³ at the droplet centre after ~0.1 second, indicating that the reaction dynamics are considerably slower than the mass-transfer dynamics. FIG. 15 shows similar results when the fractional resistance within the interface is adjusted.

Figure 16:
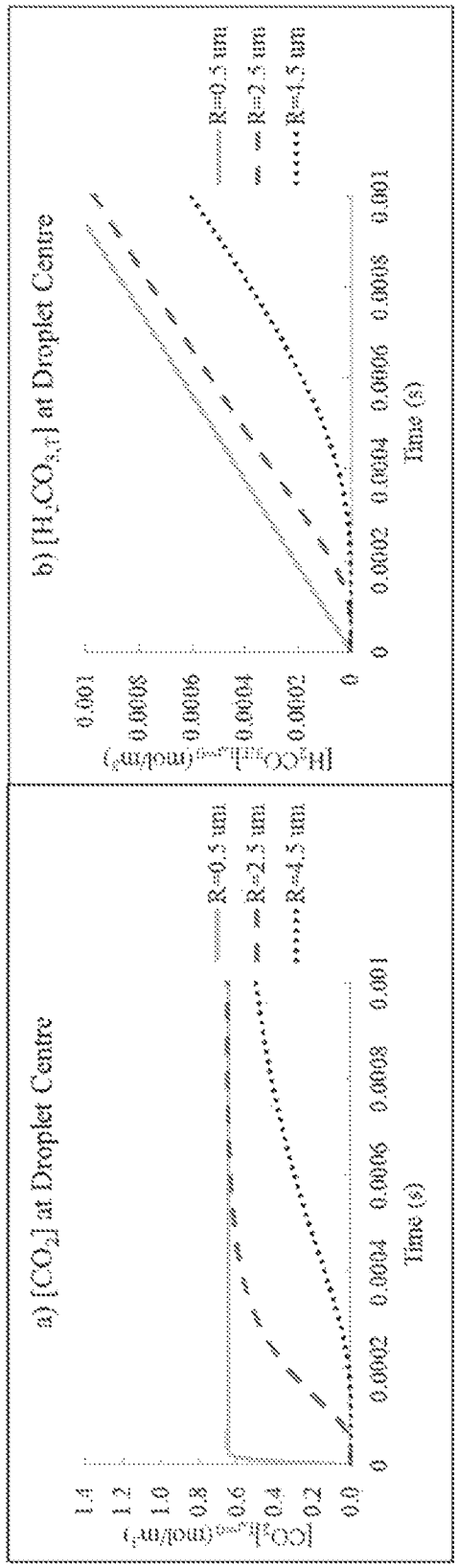
FIG. 16 shows the predicted dynamic behaviour of $[CO_2]_L$ and $[H_2CO_3, T]_L$ at the droplet centre obtained using base-case settings and a range of values of droplet sizes.

FIG. 16 shows the important influence of droplet size on the dynamics of $[CO_2]_L$ absorption and $[H_2CO_{3,T}]_L$ formation, with small droplets absorbing $CO_2$ much more quickly than larger droplets, suggesting that the droplet size has an important influence on the carbon-dioxide capture process. Note that the equilibrium concentrations predicted at long simulation times are the same for all droplet sizes, as expected.

Figure 17:
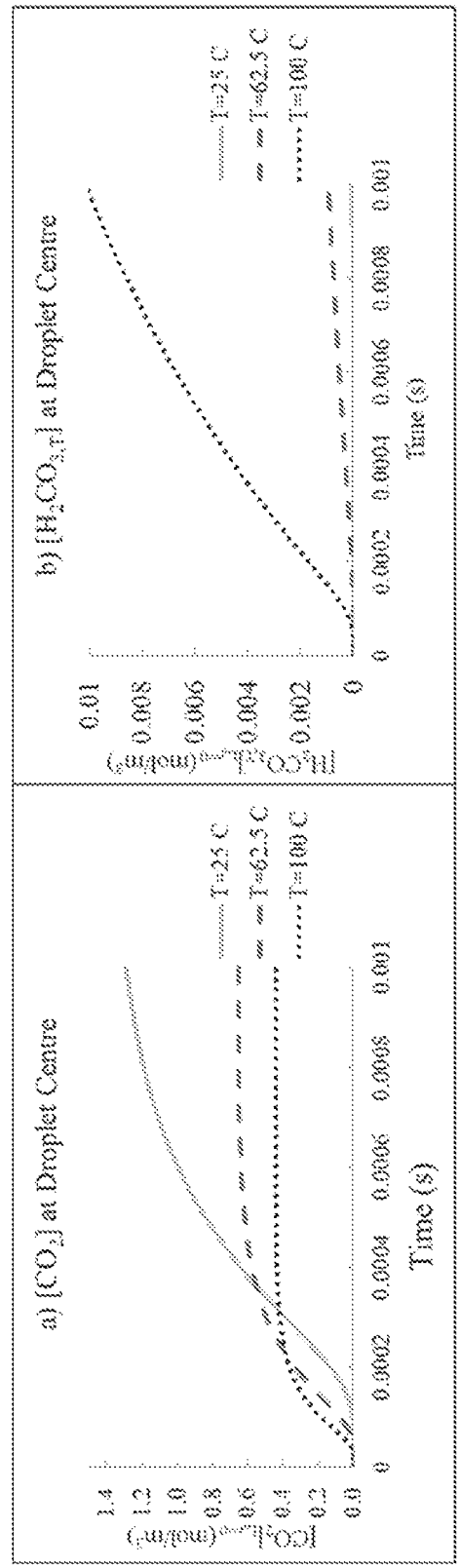
FIG. 17 shows the predicted dynamic behaviour of $[CO_2]_L$ and $[H_2CO_3, T]_L$ at the droplet centre obtained using base-case settings and a range of values of temperatures.

FIG. 17 compares the simulation results obtained using temperatures of 25° C., 62.5° C. and 100° C., accounting for the influence of temperature on Henry's law constant, kinetic rate constants and diffusivity as indicated in equations 2.1, 2.2-2.4, 2.11, and 2.12 in Table 2. The Henry's law constant increases as temperature increases, which leads to a lower equilibrium concentration of $CO_2$ dissolved within the droplet. Because mass-transfer coefficients, diffusivities and reaction rates increase with increasing temperature, the dynamics of $CO_2$ capture are faster at higher temperatures.

Figure 18:
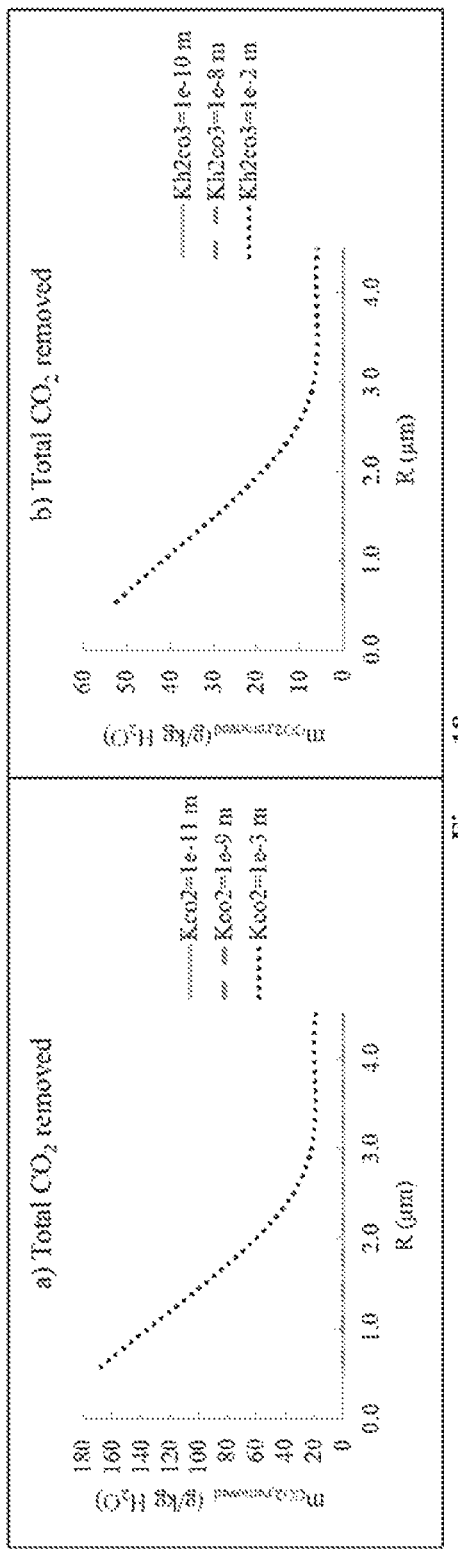
FIG. 18 shows the predicted total amount of $CO_2$ removed obtained using base-case settings and a range of values of interfacial partition coefficients.

In this sensitivity study, both $K_{IL,CO_2}$ and $K_{IL,H_2CO_3}$ are adjusted over a large range because reasonable values are not known. FIG. 18 shows that both interfacial partition coefficients have important influence on the total amount of $CO_2$ removed. As shown by the y-axes in FIG. 18, as $K_{IL,CO_2}$ and $K_{IL,H_2CO_3}$ increase, their effect on the predicted amount of $CO_2$ removed becomes larger. For example, the predicted amount of equilibrium $CO_2$ removed using a water droplet with a radius of 2.5 μm is ~35 g $CO_2$/kg $H_2O$ if $K_{IL,CO_2}$ is as high as $1 \cdot 10^{-3}$ m when other parameters are held at the base case values. Similarly, the predicted amount of $CO_2$ removed is ~10 g $CO_2$/kg $H_2O$ if $K_{IL,H_2CO_3}$ is set at $1 \cdot 10^{-2}$ m and other parameters are set at the base case values in Table 5. FIG. 18 shows that the effects of $K_{IL,CO_2}$ and $K_{IL,H_2CO_3}$ also increase dramatically as the size of the water droplet decreases. These simulation and sensitivity analysis results indicate that adsorption/absorption of $CO_2$ and/or $H_2CO_3$ at the droplet surface could explain the high levels of $CO_2$ removal that have been observed, if one of the interfacial partition coefficients (i.e. $K_{IL,CO_2}$ and $K_{IL,H_2CO_3}$) is in the range of $1 \cdot 10^{-3}$ m to $1 \cdot 10^{-2}$ m, and/or if the mean droplet size in the process is considerably smaller than R=2.5 μm. Values of the coefficients and mean droplet size obtained from careful measurements would greatly assist modeling efforts and would help to confirm whether the proposed magnitudes of these surface phenomena are realistic. Mathematical models that account for temperature effects, water evaporation and droplet coalescence may also provide a clearer picture of the $CO_2$ removal process.

In sum, the above discussion describes, a dynamic model of several mechanisms for capturing $CO_2$ in micron-size water droplets including: i) dissolution of $CO_2$ in water, ii) conversion of $CO_2$ to $H_2CO_3$ and its ions, iii) adsorption of $CO_2$ on the water droplet surface and iv) congregation of $H_2CO_3$ just inside the droplet surface. According to the simulations, and assuming constant droplet size, water droplet velocity and mass-transfer resistance at the droplet interface have no noticeable effect on the $CO_2$ adsorption/absorption process. On the other hand, the amount of $CO_2$ removed increases as temperature decreases, and as water droplet size decreases. The interfacial partition coefficients ($K_{IL,CO_2}$ and $K_{IL,H_2CO_3}$) have been shown to be very important. Unfortunately, experimental values for $K_{IL,CO_2}$ and $K_{IL,H_2CO_3}$ are not available in the literature.

Notation

| Symbols | Units | Descriptions |
|---|---|---|
| [S] | mol/m³ | Concentration of species S |
| $[S]_{LV}^*$, $[S]_{LI}^*$ | mol/m³ | Hypothetical concentration of species S in liquid phase that is in equilibrium with the species S in the vapour phase, and at the interface |
| $[S]^{sat}$ | mol/m³ | Saturation concentration of species S |
| $[S]_I$ | mol/m² | Concentration of species S within the vapour-liquid interface region |
| $[S]_R$ | mol/m³ | Concentration of species S in the liquid phase that is near the vapour-liquid interface |
| $C_p$ | J kg⁻¹ K⁻¹ | Heat capacity |
| d | m | Diameter of water droplet |
| D | m²/s | Diffusivity |
| h | J m⁻² K⁻¹ | Convective heat transfer coefficient |
| H | Pa | Henry's law constant |
| $K_2$ | mol/m³ | Equilibrium constant of reaction 4 |
| $K_{IV,S}$, $K_{IL,S}$ | m | Interface-vapour, and interface-liquid partition coefficient of species S |
| k | J m⁻¹ K⁻¹ s⁻¹ | Thermal conductivity |
| $k_{mS}$ | m/s | Mass transfer coefficient of species S |
| $k_{-1}$ | 1/s | Rate constant of dehydration reaction |
| $k_1$ | m³ mol⁻¹ s⁻¹ | Rate constant of hydration reaction |
| M | kg/mol | Molecular weight |

-continued

| Symbols | Units | Descriptions |
|---|---|---|
| $m_{CO_2, removed}$ | g/kg H$_2$O | Total amount of CO$_2$ removed by the water droplet |
| Nu | — | Nusselt number |
| P | Pa | Pressure of the system |
| Pr | — | Prandtl number |
| r | m | Radial position within water droplet |
| R | m | Radius of water droplet |
| $R_{const}$ | m$^3$ Pa K$^{-1}$ mol$^{-1}$ | Gas constant ($R_{const}$ = 8.3144598 m$^3$ Pa K$^{-1}$ mol$^{-1}$) |
| Re | — | Reynolds number |
| Sc | — | Schmidt number |
| Sh | — | Sherwood number |
| t | s | Time |
| T | K | Temperature |
| u | m/s | Velocity |
| Σv | m$^3$/kmol | Sum of the atomic volumes of all elements for each molecule |
| x | — | Molar fraction in the liquid phase |
| y | — | Molar fraction in the vapour phase |
| Greek Letters | | |
| μ | kg m$^{-1}$ s$^{-1}$ | Dynamic viscosity |
| ρ | kg/m$^3$ | Density |
| Subscripts | | |
| 0 | | Initial value (at t = 0) |
| d | | Water droplet |
| I | | Vapour-liquid interface properties |
| L | | Liquid phase properties |
| R | | At the surface of the bulk liquid |
| S | | Chemical species (can be either organic compounds, CO$_2$, N$_2$, O$_2$, and H$_2$O) |
| V | | Vapour phase properties |
| LI | | Direction of mass transfer from the bulk liquid to the interface |

The description of the disclosure will be more clearly understood by reference to the following examples, which are included herewith for purposes of illustration only and are not intended to be limiting.

EXAMPLES

Example 1. A System for Capturing CO$_2$ from a Flue Gas Equivalent to a 25 MW Coal-Fired Unit Downstream of Existing Emission Control Device A system is constructed with a 282,000 gallon vessel with a grid of nozzle arrays placed inside of the vessel as depicted in FIG. 3A. The nozzles have an orifice diameter of 0.012 in. The headers are arranged as depicted in FIG. 3A-B. The water flow for each nozzle is at a rate of 1 to 1.5 gpm. The nozzles spray droplets of fluid into the flue gas stream to remove the CO$_2$. The droplet speed is 31,716 ft/min. The flue gas temperature is at 135° F. in this system. The flue gas enters the vessel at a rate of 323,140 lb/hr. The wetted volume has a fluid droplet density of 4 gallons of fluid per 1000 cubic feet of flue gas. The fogging skid has four 25% high pressure pumps to ensure the appropriate water pressure of 2,000 psi.

Calculation of Droplet Speed

A system is constructed with a nozzle layout as depicted in FIGS. 3-6. The system is pressurized with water at 2000 psi. Using multi-faceted nozzles, the flow through each nozzle has the following characteristics:

| | | |
|---|---|---|
| Water Flow | 0.1863 | gpm |
| Water Flow | 0.0249 | ft$^3$/min |
| Orifice Dia | 0.012 | in |
| Cross-sectional Area | 7.854E-07 | ft$^2$ |
| Velocity | 31,716 | ft/min |
| Relative Velocity | 0.44 | Mach Number* |

*corrected for temperature

The wastewater is collected from the bottom of the vessel and routed to a settling tank made of fiber reinforced polymer. The settling tank has the capacity to hold 16 hours of wastewater discharge. As the wastewater enters the settling tank, a portion of the CO$_2$ separates and exits through vents provided at the top of the tank for collection. The wastewater is routed to an aggravator tank where the fluid is mixed causing the remaining CO$_2$ to be captured. The wastewater is routed to a holding tank, which can have a mixer. The mixer ensures that any additional CO$_2$ separates from the wastewater into the venting system. The system has one settling, one aggravator, and one holding tank. These tanks have capacities of 314,000, 75,000 and 222,000 gallons, respectively.

From the holding tank, the water is routed to the reverse osmosis system where it is processed for reinjection into the system to capture $CO_2$. The system can also use city water if it meets certain water quality requirements.

Example 2. A Large Modular System for Capturing $CO_2$ from a Flue Gas from a 250 MW Coal-Fired Unit A system is constructed with four parallel $CO_2$ capture vessels (FIG. 2). Each 560,000 gallon vessel has a nozzle array layout (fogging array) placed inside of the vessel as depicted in FIG. 3A. The nozzles have an orifice diameter of 0.0125 in. The headers are arranged as depicted in FIG. 3A. The water flow is at a rate of 767 gpm for each $CO_2$ capture vessel. The nozzles spray droplets of fluid into the flue gas stream to remove the $CO_2$. The droplet speed is 31,716 ft/min. The flue gas temperature is at 135° F. in this system if the system also captures or reduces at least one pollutant. The flue gas enters each vessel at a rate of 661,996 lb/hr. The wetted volume has a fluid droplet density of 4 gallons of fluid per 1000 cubic feet of flue gas. The system is pressurized to the appropriate water pressure of 1,500 psi.

Calculation of Droplet Speed

Using multi-faceted nozzles, the flow through each nozzle has the following characteristics:

| | | |
|---|---|---|
| Water Flow | 0.1614 | gpm |
| Water Flow | 0.0216 | ft³/min |
| Orifice Dia | 0.012 | in |
| Cross-sectional Area | 7.854E−07 | ft² |
| Velocity | 27,467 | ft/min |
| Relative Velocity | 0.38 | Mach Number |

The wastewater is collected from the bottom of the vessel and routed to a settling tank made of fiber reinforced polymer. As the wastewater enters the settling tank at a rate of 1,413 gpm, a portion of the $CO_2$ separates and exits through vents provided at the top of the tank for collection. The wastewater is routed at a rate of 1,354 gpm to an aggravator tank where the fluid is mixed causing the remaining $CO_2$ to be captured. The wastewater is routed at a rate of 1,274 gpm to a holding tank. The mixer ensures that any additional $CO_2$ separates from the wastewater into the venting system. The system has one set of settling, aggravator, and holding tanks for each $CO_2$ capture vessel.

From the holding tank, the water is routed to the reverse osmosis system where it is processed for reinjection into the system to capture $CO_2$. The system can also use city water if it meets certain water quality requirements.

The system uses an average of 1,157 gpm of water. Overall, this system has a $CO_2$ recovery rate of approximately 349,451 lb/hr.

INCORPORATION BY REFERENCE

All U.S. patents and U.S. and PCT published patent applications mentioned in the description above are incorporated by reference herein in their entirety.

EQUIVALENTS

Having now fully described the methods and systems for capturing carbon dioxide in some detail by way of illustration and example for purposes of clarity of understanding, it will be obvious to one of ordinary skill in the art that the same can be performed by modifying or changing the methods and systems within a wide and equivalent range of conditions, formulations and other parameters without affecting the scope or any specific embodiment thereof, and that such modifications or changes are intended to be encompassed within the scope of the appended claims.

What is claimed is:

1. A method of treating gas comprising:
providing a stream of gas comprising carbon dioxide, wherein the gas is flowing in a first direction;
receiving the stream of gas comprising carbon dioxide within a carbon capture vessel, the carbon capture vessel including a first end and second end with at least one sidewall therebetween defining an interior volume;
dispensing a fluid consisting essentially of water via a plurality of nozzles, wherein each of the nozzles has a single conduit configured to receive the essentially amine-free water, wherein the fluid dispensed by each nozzle is essentially free of amines, and wherein dispensing the fluid comprises spraying droplets of the fluid, and further wherein at least 90% of the droplets have a droplet size of less than about 50 microns, wherein spraying the droplets comprises spraying the droplets at a droplet speed of less than Mach 1, wherein dispensing the fluid consisting essentially of water via a plurality of nozzles includes providing the fluid at a continuous operating fluid pressure of between approximately 700 psi to approximately 2,000 psi to each nozzle of the plurality of nozzles, wherein the fluid essentially free of amines is dispensed within the interior of the carbon capture vessel
thereby capturing carbon dioxide from the stream of gas, wherein the essentially amine-free fluid contacts the stream of gas within the interior of the carbon capture vessel and proximate an entry point of the gas.

2. The method of claim 1, wherein dispensing the fluid comprises creating a wetted volume, the wetted volume having a fluid droplet density of less than or equal to 5 gallons of fluid per 1000 cubic feet of gas.

3. The method of claim 2, wherein the gas has a residence time in the wetted volume of less than 10 seconds.

4. The method of claim 1, wherein dispensing the fluid comprises dispensing the fluid at a rate of less than 20 gallons per 1000 cubic feet of gas.

5. The method of claim 1, wherein the fluid consists essentially of water.

6. A method of producing carbon dioxide, comprising:
treating a gas according to the method of claim 1; and
collecting carbon dioxide from the fluid.

7. The method of claim 6, wherein collecting carbon dioxide from the fluid comprises:
combining the fluid droplets in a first fluid tank;
outgassing gaseous carbon dioxide from the fluid; and
directing the gaseous carbon dioxide to a carbon dioxide container.

8. The method of claim 7, wherein the outgassing step comprises agitating the fluid.

9. The method of claim 7, wherein the outgassing step comprises heating the fluid.

10. The method of claim 1, wherein at least one nozzle of the plurality of nozzles comprises a central axis and an orifice disposed at an angle with respect to the central axis.

11. The method of claim 10, wherein the nozzles are in fluid communication with a common water supply conduit.

12. The method of claim 11, wherein the nozzles are configured so that there is a greater amount of dispensing located at the center of the gas stream.

13. The method of claim 1, wherein at least 90% of the droplets have a droplet size of 5-35 microns.

14. The method of claim 1, wherein providing the stream of gas comprises providing the stream of gas within a first plenum, the stream of gas flowing within the first plenum in a direction perpendicular to the first direction, the first plenum in fluid communication with the carbon capture vessel, wherein the stream of gas exits the carbon capture vessel through a demister, the demister perpendicular to the first direction and in fluid communication with a second plenum, the stream of gas flowing within the second plenum perpendicular to the first direction, the stream of gas further flowing through an exhaust fan to an exhaust stack.

15. The method of claim 1, wherein each nozzle of the plurality of nozzles is a spider nozzle, each spider nozzle having a central axis and a plurality of arms, each arm having at least one orifice, each orifice disposed at a 45 degree angle to the central axis.

16. The method of claim 1, wherein each of the plurality of nozzles is configured to spray droplets of the fluid that avoid droplet collision and agglomeration with droplets sprayed by the plurality of nozzles.

17. The method of claim 1, wherein 90% of the droplets have a droplet size of less than 30 microns.

* * * * *